(12) United States Patent
Alghanem et al.

(10) Patent No.: US 11,885,886 B2
(45) Date of Patent: Jan. 30, 2024

(54) SYSTEMS AND METHODS FOR CAMERA-LIDAR FUSED OBJECT DETECTION WITH LIDAR-TO-IMAGE DETECTION MATCHING

(71) Applicant: FORD GLOBAL TECHNOLOGIES, LLC, Dearborn, MI (US)

(72) Inventors: Basel Alghanem, Pittsburgh, PA (US); Arsenii Saranin, Pittsburgh, PA (US); G. Peter K. Carr, Allison Park, PA (US); Kevin Lee Wyffels, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 639 days.

(21) Appl. No.: 17/078,543

(22) Filed: Oct. 23, 2020

(65) Prior Publication Data

US 2022/0128701 A1  Apr. 28, 2022

(51) Int. Cl.
    *G01S 17/931*   (2020.01)
    *G01S 7/497*    (2006.01)
    *G01S 17/894*   (2020.01)

(52) U.S. Cl.
    CPC ............ *G01S 17/931* (2020.01); *G01S 7/497* (2013.01); *G01S 17/894* (2020.01)

(58) Field of Classification Search
    CPC ....... G01S 17/931; G01S 17/894; G01S 7/497
    See application file for complete search history.

(56) References Cited

U.S. PATENT DOCUMENTS

| 6,580,385 | B1 | 6/2003 | Winner et al. |
| 8,704,887 | B2 | 4/2014 | Zeng |

(Continued)

FOREIGN PATENT DOCUMENTS

| JP | 4211809 B2 | 1/2009 |
| KR | 20200096723 A | 8/2020 |

(Continued)

OTHER PUBLICATIONS

U.S. Appl. No. 17/101,313, filed Nov. 23, 2020, Systems and Methods for Object Detection With LIDAR Decorrelation.

(Continued)

*Primary Examiner* — Ramsey Refai
(74) *Attorney, Agent, or Firm* — Frank MacKenzie; Brooks Kushman P.C.

(57) ABSTRACT

Systems and methods for object detection. The object detection may be used to control an autonomous vehicle. For example, the methods comprise: obtaining, by a computing device, a LiDAR dataset generated by a LiDAR system of the autonomous vehicle; and using, by the computing device, the LiDAR dataset and at least one image to detect an object that is in proximity to the autonomous vehicle. The object is detected by: matching points of the LiDAR dataset to pixels in the at least one image; and detecting the object in a point cloud defined by the LiDAR dataset based on the matching. The object detection may be used to facilitate at least one autonomous driving operation (e.g., autonomous driving operation comprises an object tracking operation, an object trajectory prediction operation, a vehicle trajectory determination operation, and/or a collision avoidance operation).

23 Claims, 17 Drawing Sheets

(56) References Cited

U.S. PATENT DOCUMENTS

| | | | |
|---|---|---|---|
| 9,014,903 B1* | 4/2015 | Zhu | G01S 17/875 382/106 |
| 9,529,087 B2 | 12/2016 | Stainvas Olshansky et al. | |
| 9,870,437 B2 | 1/2018 | Pope et al. | |
| 10,599,931 B2 | 3/2020 | Miville et al. | |
| 10,921,817 B1 | 2/2021 | Kangaspunta | |
| 2009/0251355 A1 | 10/2009 | Nanami | |
| 2012/0163671 A1 | 6/2012 | Choi et al. | |
| 2014/0347207 A1 | 11/2014 | Zeng et al. | |
| 2018/0189578 A1 | 7/2018 | Yang et al. | |
| 2018/0232947 A1 | 8/2018 | Nehmadi et al. | |
| 2018/0329066 A1 | 11/2018 | Pacala | |
| 2018/0348346 A1 | 12/2018 | Vallespi-Gonzalez et al. | |
| 2019/0065637 A1 | 2/2019 | Bogdoll et al. | |
| 2019/0236381 A1 | 8/2019 | Rochan Meganathan et al. | |
| 2019/0279000 A1 | 9/2019 | Pfeifle et al. | |
| 2019/0285752 A1 | 9/2019 | Chattopadhyay et al. | |
| 2019/0311546 A1* | 10/2019 | Tay | G05D 1/0088 |
| 2019/0340775 A1 | 11/2019 | Lee et al. | |
| 2019/0387216 A1 | 12/2019 | Hicks | |
| 2020/0005489 A1 | 1/2020 | Kroeger | |
| 2020/0333439 A1 | 10/2020 | Mahajan | |
| 2021/0097858 A1 | 4/2021 | Moretti et al. | |
| 2021/0145952 A1 | 5/2021 | Mahr et al. | |
| 2021/0208281 A1* | 7/2021 | Trofymov | G01S 7/4972 |
| 2021/0263525 A1 | 8/2021 | Das et al. | |
| 2022/0107414 A1* | 4/2022 | Maheshwari | G01S 13/588 |

FOREIGN PATENT DOCUMENTS

| | | |
|---|---|---|
| WO | 2020020654 A1 | 1/2020 |
| WO | 2020043041 A1 | 3/2020 |

OTHER PUBLICATIONS

U.S. Appl. No. 17/078,532, filed Oct. 23, 2020, Systems and Methods for Camera-LIDAR Fused Object Detection With Point Pruning.

U.S. Appl. No. 17/078,548, filed Oct. 23, 2020, Systems and Methods for Camera-LIDAR Fused Object Detection With Local Variation Segmentation.

U.S. Appl. No. 17/078,561, filed Oct. 23, 2020, Systems and Methods for Camera-LIDAR Fused Object Detection With Segment Merging.

U.S. Appl. No. 17/078,575, filed Oct. 23, 2020, Systems and Methods for Camera-LIDAR Fused Object Detection With Segment Filtering.

De Silva et al., Fusion of LiDAR and Camera Sensor Data for Environment Sensing in Driverless Vehicles, Environmental Science, Computer Science ArXiv, Oct. 17, 2017.

Lin, Y. et al., "Planar-Based Adaptive Down-Sampling of Point Clouds," Photogrammetric Engineering & Remote Sensing, pp. 955-066, Dec. 2016.

Chen, S. et al., "Fast Resampling of 3D Point Clouds via Graphs," [cs:CV], Feb. 2017.

"Camera-LiDAR Fusions Sensor," Sensing Technology, CES 2020, Kyocera; https://global.kyocera.com/ces/sensing-technology/, May 2020.

Ben-Shabat, Y. et al., "Graph Based Over-Segmentation Methods for 3D Point Clouds," [cs:CV], pp. 1-15, Feb. 2017.

Information about Related Patents and Patent Applications, see section 6 of the accompanying Information Disclosure Statement Letter, which concerns Related Patents and Patent Applications.

* cited by examiner

SYSTEMS AND METHODS FOR CAMERA-LIDAR FUSED OBJECT DETECTION WITH LIDAR-TO-IMAGE DETECTION MATCHING

BACKGROUND

Statement of the Technical Field

The present disclosure relates generally to object detection systems. More particularly, the present disclosure relates to implementing systems and methods for camera-LiDAR Fused ("CLF") object detection with LiDAR-to-image detection matching.

DESCRIPTION OF THE RELATED ART

Modern day vehicles have at least one on-board computer and have internet/satellite connectivity. The software running on these on-board computers monitor and/or control operations of the vehicles. The vehicle also comprises LiDAR detectors for detecting objects in proximity thereto. The LiDAR detectors generate LiDAR datasets that measure the distance from the vehicle to an object at a plurality of different times. These distance measurements can be used for tracking movements of the object, making predictions as to the objects trajectory, and planning paths of travel for the vehicle based on the predicted objects trajectory.

SUMMARY

The present disclosure concerns implementing systems and methods for object detection with LiDAR-to-image detection matching. The object detection may be used to control an autonomous vehicle. In this scenario, the methods comprise: obtaining, by a computing device, a LiDAR dataset generated by a LiDAR system of the autonomous vehicle; and using, by a computing device, the LiDAR dataset and at least one image to detect an object that is in proximity to the autonomous vehicle. The object is detected by: matching points of the LiDAR dataset to pixels in the at least one image; and detecting the object in a point cloud defined by the LiDAR dataset based on the matching. The object detection is used to facilitate at least one autonomous driving operation (e.g., autonomous driving operation comprises an object tracking operation, an object trajectory prediction operation, a vehicle trajectory determination operation, and/or a collision avoidance operation).

In some scenarios, the methods also comprise obtaining, by the computing device, at least one image that was captured at a time when a sensor of the LiDAR system swept over a center of a camera Field Of View ("FOV"), wherein the at least one image is used in addition to the LiDAR dataset to detect the object. The matching may be based on identifiers for each object detected in the at least one image, a mask identifier, cell identifiers for a mask, confidence values for each cell, LiDAR point identifiers, LiDAR point coordinates, extrinsic LiDAR sensor and camera calibration parameters, and/or intrinsic camera calibration parameters.

The matching may comprise determining a probability distribution of pixels of the at least one image to which a point of the LiDAR dataset may project taking into account a projection uncertainty in view of camera calibration uncertainties. The probability distribution is determined by computing a probability distribution function over image space coordinates for a pixel to which a point of the LiDAR dataset would probably project. The probability distribution function may be computed in accordance with following mathematical equation $$\begin{bmatrix} x^i \\ y^i \\ 1 \end{bmatrix} = M_{int} T_{Vehicle}^{Camera} T_{LiDAR}^{Vehicle} \begin{bmatrix} X \\ Y \\ Z \\ 1 \end{bmatrix}$$

where $x^i$ and $y^i$ represent image space coordinates for a pixel, and X, Y and Z represent LiDAR space coordinates for a point of the LiDAR dataset. The probability distribution function may be converted to image detection mask coordinates in accordance with the following mathematical equation $$x^m = R \frac{x^i - x_{bbox}^-}{x_{bbox}^+ - x_{bbox}^-}$$

where $x_{bbox}^+$ and $x_{bbox}^-$ represent image space boundaries of a bounding box, and R represents a mask resolution.

Alternatively or additionally, the matching comprises determining a probability distribution over a set of object detections in which a point of the LiDAR dataset is likely to be, based on at least one confidence value indicating a level of confidence that at least one respective pixel of the at least one image belongs to a given detected object. The probability distribution may be determined by computing a probability that a point of the LiDAR dataset projects into an image detection independent of all other image detections. For example, the probability may be computed in accordance with the following mathematical equation(s).

$$p(lp \in mp) \int_{mp} f(x^m, y^m) = dmp = \int_{x_{mp}^-}^{x_{mp}^+} \int_{y_{mp}^-}^{y_{mp}^+} f(x^m, y^m) dy dx$$

$$[\backslash bbox?] ip(lp \in d) = p(d) \sum_{mask} p(lp \in mp) p(mp \in d) =$$

$$p(d) \sum_{x=0}^{R} \sum_{y=0}^{R} p(lp \in mp_{x,y}) p(mp_{x,y} \in d)$$

where lp is a LiDAR point, mp is a mask pixel, $[x_{mp}^-, x_{mp}^+]$ represent the x limits of a pixel in mask coordinates, $[y_{mp}^-, y_{mp}^+]$ represents they limits of the pixel in mask coordinates, dmp represents a mask pixel associated with a given object detection d, dy represents y-axis coordinate for a mask pixel associated with the given object detection d, and dx represents an x-axis coordinate for the mask pixel associated with the given object detection d.

Alternatively or additionally, the matching comprises determining a probability that the LiDAR point does not project into any image detection. For example, the matching involves normalizing a plurality of probabilities determined for a given point of the LiDAR dataset in accordance with the following mathematical equation $$dp(lp \in d_i) = p(\exists d\ lp \in d) dp(lp \in d_i \mid \exists d\ lp \in d) =$$

$$[1 - p(\forall d\ lp \notin d)] \frac{ip(lp \in d_i)}{\sum_{detections} ip(lp \in d)},$$

where ip(lp∈d) represents a probability that that a point of the LiDAR dataset projects into an image detection independent of all other image detections and p($\forall$d lp∉d) represents a probability that the LiDAR point does not project into any image detection.

BRIEF DESCRIPTION OF THE DRAWINGS

The present solution will be described with reference to the following drawing figures, in which like numerals represent like items throughout the figures.

DETAILED DESCRIPTION

Figure 1:
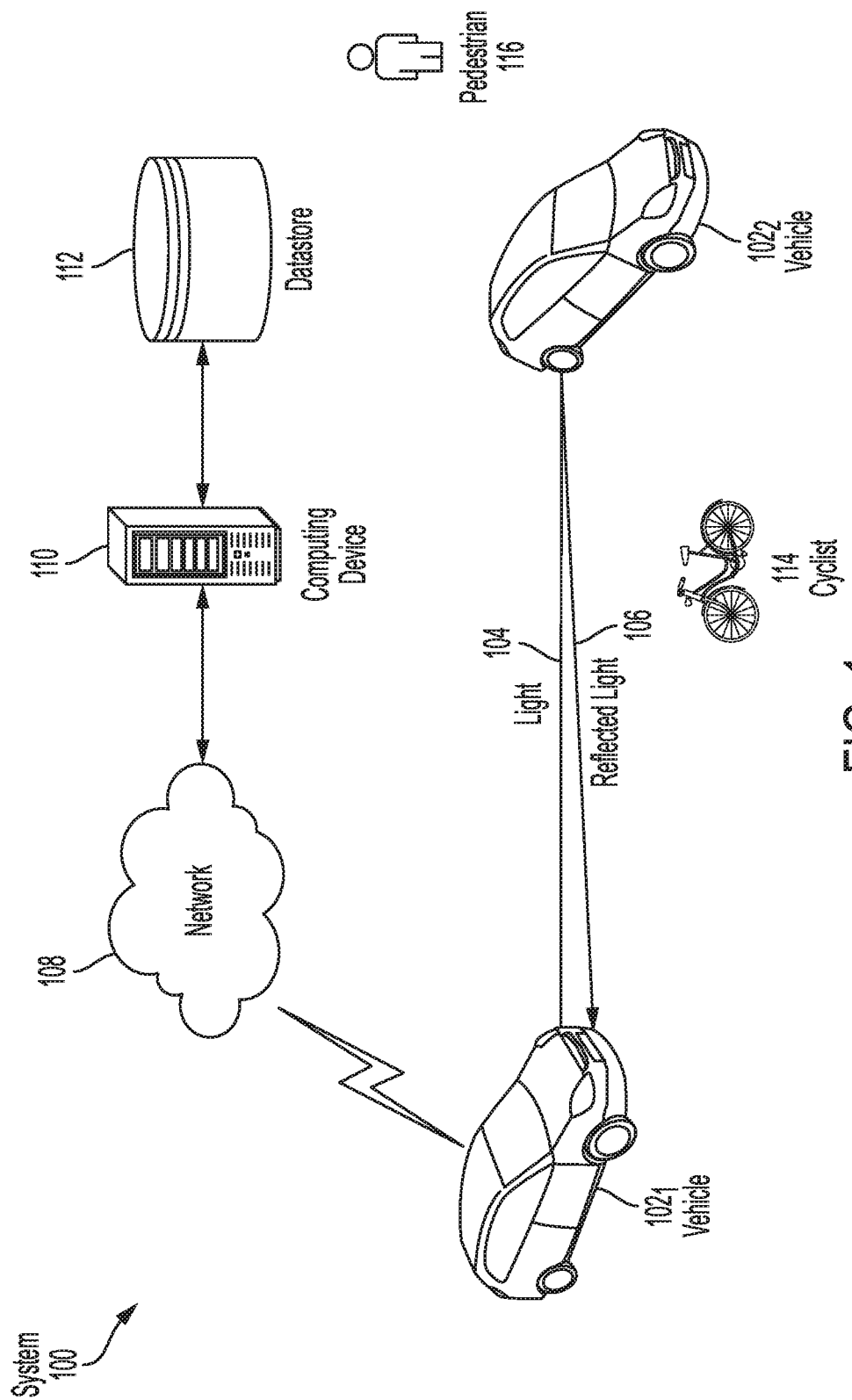
FIG. 1 is an illustration of an illustrative system.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

Real-time prediction of actions by drivers of other vehicles and pedestrians is a challenge for on-road semi-autonomous or autonomous vehicle applications. Such real-time prediction is particularly challenging when the drivers and/or pedestrians break traffic rules. Systematically assuming the worst case action from the drivers and/or pedestrians will paralyze the self-driving vehicle, but erroneously optimistic predictions can result in unsafe autonomous vehicle behavior.

This document describes methods and systems that are directed to addressing the problems described above, and/or other issues. Accordingly, the present solution concerns systems and methods for controlling vehicles. The methods generally involve: generating a vehicle trajectory for the vehicle that is in motion; performing CLF object detection operations to detect an object within a given distance from the vehicle; generating at least one possible object trajectory for the object which was detected; using the vehicle trajectory and at least one possible object trajectory to determine whether there is an undesirable level of risk that a collision will occur between the vehicle and the object; and modifying the vehicle trajectory when a determination is made that there is an undesirable level of risk that the collision will occur.

Notably, the present solution is being described herein in the context of an autonomous vehicle. The present solution is not limited to autonomous vehicle applications. The present solution can be used in other applications such as robotic application, radar system application, metric applications, and/or system performance applications.

Illustrative Systems

Referring now to FIG. 1, there is provided an illustration of an illustrative system 100. System 100 comprises a vehicle $102_1$ that is traveling along a road in a semi-autonomous or autonomous manner. Vehicle $102_1$ is also referred to herein as an Autonomous Vehicle ("AV"). The AV $102_1$ can include, but is not limited to, a land vehicle (as shown in FIG. 1), an aircraft, or a watercraft.

AV $102_1$ is generally configured to detect objects $102_2$, 114, 116 in proximity thereto. The objects can include, but are not limited to, a vehicle $102_2$, cyclist 114 (such as a rider of a bicycle, electric scooter, motorcycle, or the like) and/or a pedestrian 116. The object detection is achieved in accordance with a novel CLF object detection process. The novel CLF object detection process will be described in detail below. When such a detection is made, AV $102_1$ performs operations to: generate one or more possible object trajectories for the detected object; and analyze at least one of the generated possible object trajectories to determine whether or not there is an undesirable level of risk that a collision will occur between the AV and object in a threshold period of time (e.g., 1 minute). If so, the AV $102_1$ performs operations to determine whether the collision can be avoided if a given vehicle trajectory is followed by the AV $102_1$ and any one of a plurality of dynamically generated emergency maneuvers is performed in pre-defined time period (e.g., N milliseconds). If the collision can be avoided, then the AV $102_1$ takes no action or optionally performs a cautious maneuver (e.g., mildly slows down). In contrast, if the collision cannot be avoided, then the AV $102_1$ immediately takes an emergency maneuver (e.g., brakes and/or changes direction of travel).

Figure 2:
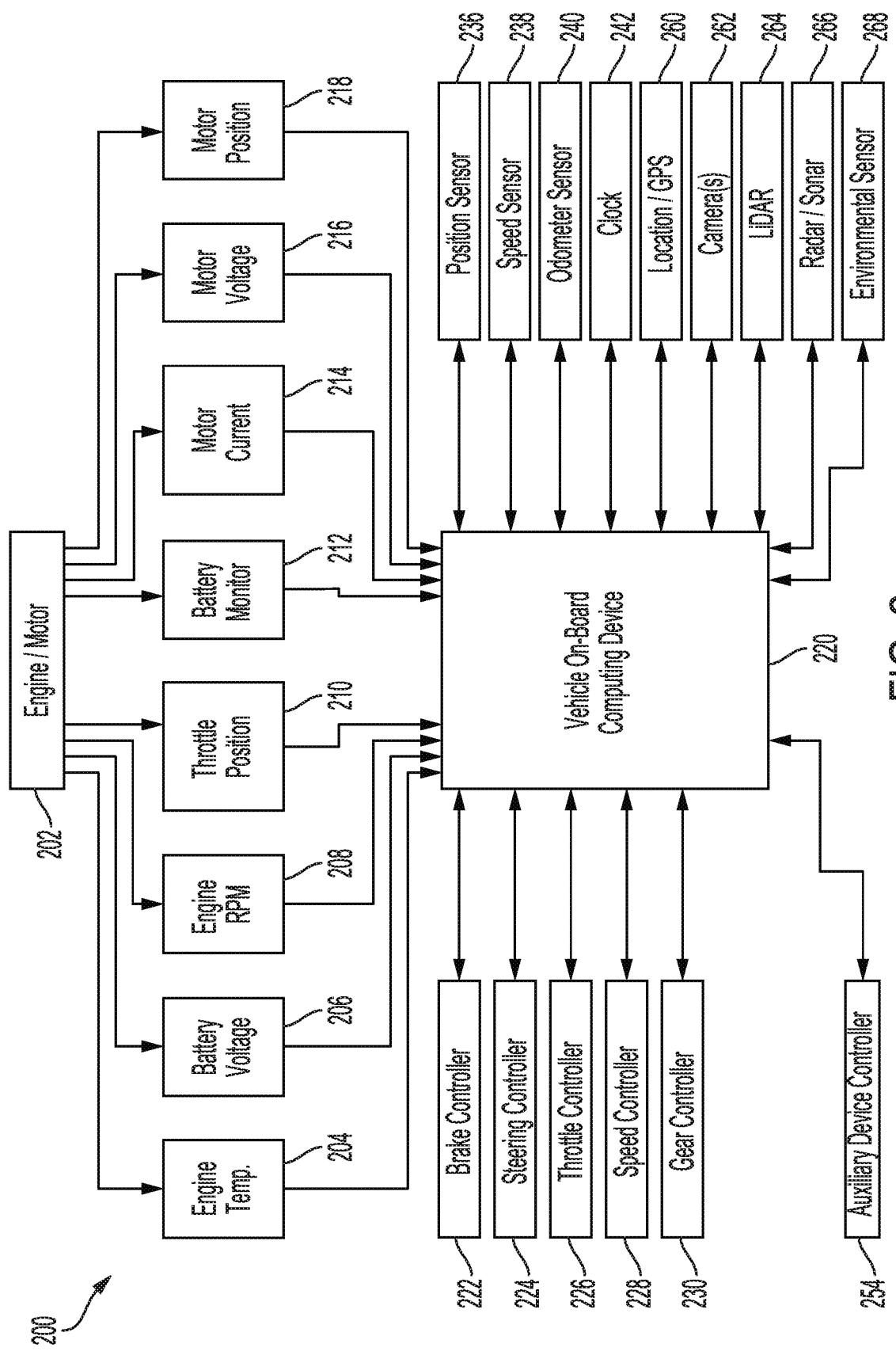
FIG. 2 is an illustration of an illustrative architecture for a vehicle.

Referring now to FIG. 2, there is provided an illustration of an illustrative system architecture 200 for a vehicle. Vehicles $102_1$ and/or $102_2$ of FIG. 1 can have the same or similar system architecture as that shown in FIG. 2. Thus, the following discussion of system architecture 200 is sufficient for understanding vehicle(s) $102_1$, $102_2$ of FIG. 1.

As shown in FIG. 2, the vehicle 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is an electric or hybrid vehicle, then the vehicle may have an electric motor, and accordingly will have sensors such as a battery monitoring system 212 (to measure current, voltage and/or temperature of the battery), motor current 214 and voltage 216 sensors, and motor position sensors such as resolvers and encoders 218.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 260 (e.g., a Global Positioning System ("GPS") device); object detection sensors such as one or more cameras 262; a LiDAR sensor system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to an on-board computing device 220. The on-board computing device 220 analyzes the data captured by the sensors and optionally controls operations of the vehicle based on results of the analysis. For example, the on-board computing device 220 may control: braking via a brake controller 232; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as LiDAR 264 is communicated from those sensors) to the on-board computing device 220. The object detection information and/or captured images are processed by the on-board computing device 220 to detect objects in proximity to the vehicle 200. Any known or to be known technique for making an object detection based on sensor data and/or captured images can be used in the embodiments disclosed in this document.

LiDAR information is communicated from LiDAR sensor 264 to the on-board computing device 220. Additionally, captured images are communicated from the camera(s) 262 to the on-board computing device 220. The LiDAR information and/or captured images are processed by the on-board computing device 220 to detect objects in proximity to the vehicle 200. The manner in which the object detections are made by the on-board computing device 220 will become evident as the discussion progresses.

When the on-board computing device 220 detects a moving object, the on-board computing device 220 will generate one or more possible object trajectories for the detected object, and analyze the possible object trajectories to assess the risk of a collision between the object and the AV. If the risk exceeds an acceptable threshold, the on-board computing device 220 performs operations to determine whether the collision can be avoided if the AV follows a defined vehicle trajectory and/or implements one or more dynamically generated emergency maneuvers is performed in a pre-defined time period (e.g., N milliseconds). If the collision can be avoided, then the on-board computing device 220 may cause the vehicle 200 to perform a cautious maneuver (e.g., mildly slow down, accelerate, or swerve). In contrast, if the collision cannot be avoided, then the on-board computing device 220 will cause the vehicle 200 to take an emergency maneuver (e.g., brake and/or change direction of travel).

Figure 3:
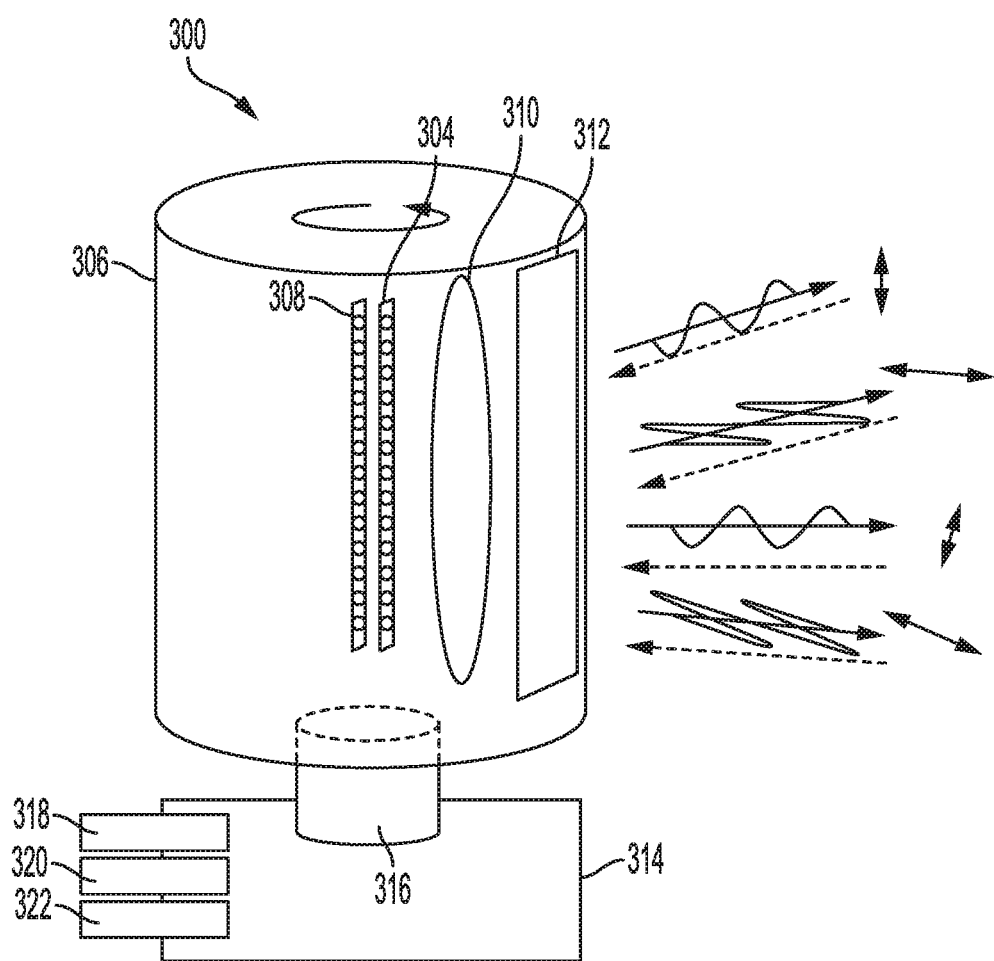
FIG. 3 is an illustration of an illustrative architecture for a LiDAR system employed by the vehicle shown in FIG. 2.

Referring now to FIG. 3, there is provided an illustration of an illustrative LiDAR system 300. LiDAR system 264 of FIG. 2 may be the same as or substantially similar to the LiDAR system 300. As such, the discussion of LiDAR system 300 is sufficient for understanding LiDAR system 264 of FIG. 2.

As shown in FIG. 3, the LiDAR system 300 includes a housing 306 which may be rotatable 360° about a central axis such as hub or axle 316. The housing may include an emitter/receiver aperture 312 made of a material transparent to light. Although a single aperture is shown in FIG. 2, the present solution is not limited in this regard. In other scenarios, multiple apertures for emitting and/or receiving light may be provided. Either way, the LiDAR system 300 can emit light through one or more of the aperture(s) 312 and receive reflected light back toward one or more of the aperture(s) 211 as the housing 306 rotates around the internal components. In an alternative scenarios, the outer shell of housing 306 may be a stationary dome, at least partially made of a material that is transparent to light, with rotatable components inside of the housing 306.

Inside the rotating shell or stationary dome is a light emitter system 304 that is configured and positioned to generate and emit pulses of light through the aperture 312 or through the transparent dome of the housing 306 via one or more laser emitter chips or other light emitting devices. The emitter system 304 may include any number of individual emitters (e.g., 8 emitters, 64 emitters, or 128 emitters). The emitters may emit light of substantially the same intensity or of varying intensities. The individual beams emitted by the light emitter system 304 will have a well-defined state of polarization that is not the same across the entire array. As an example, some beams may have vertical polarization and other beams may have horizontal polarization. The LiDAR system will also include a light detector 308 containing a photodetector or array of photodetectors positioned and configured to receive light reflected back into the system. The emitter system 304 and light detector 308 would rotate with the rotating shell, or they would rotate inside the stationary dome of the housing 306. One or more optical element structures 310 may be positioned in front of the light emitting unit 304 and/or the light detector 308 to serve as one or more lenses or waveplates that focus and direct light that is passed through the optical element structure 310.

One or more optical element structures 310 may be positioned in front of a mirror 312 to focus and direct light that is passed through the optical element structure 310. As shown below, the system includes an optical element structure 310 positioned in front of the mirror 312 and connected to the rotating elements of the system so that the optical element structure 310 rotates with the mirror 312. Alternatively or in addition, the optical element structure 310 may include multiple such structures (for example lenses and/or waveplates). Optionally, multiple optical element structures 310 may be arranged in an array on or integral with the shell portion of the housing 306.

Optionally, each optical element structure 310 may include a beam splitter that separates light that the system receives from light that the system generates. The beam splitter may include, for example, a quarter-wave or half-wave waveplate to perform the separation and ensure that received light is directed to the receiver unit rather than to the emitter system (which could occur without such a waveplate as the emitted light and received light should exhibit the same or similar polarizations).

The LiDAR system will include a power unit 318 to power the light emitting unit 304, a motor 316, and electronic components. The LiDAR system will also include an analyzer 314 with elements such as a processor 322 and non-transitory computer-readable memory 320 containing programming instructions that are configured to enable the system to receive data collected by the light detector unit, analyze it to measure characteristics of the light received, and generate information that a connected system can use to make decisions about operating in an environment from which the data was collected. Optionally, the analyzer 314 may be integral with the LiDAR system 300 as shown, or some or all of it may be external to the LiDAR system and communicatively connected to the LiDAR system via a wired or wireless communication network or link.

Figure 4:
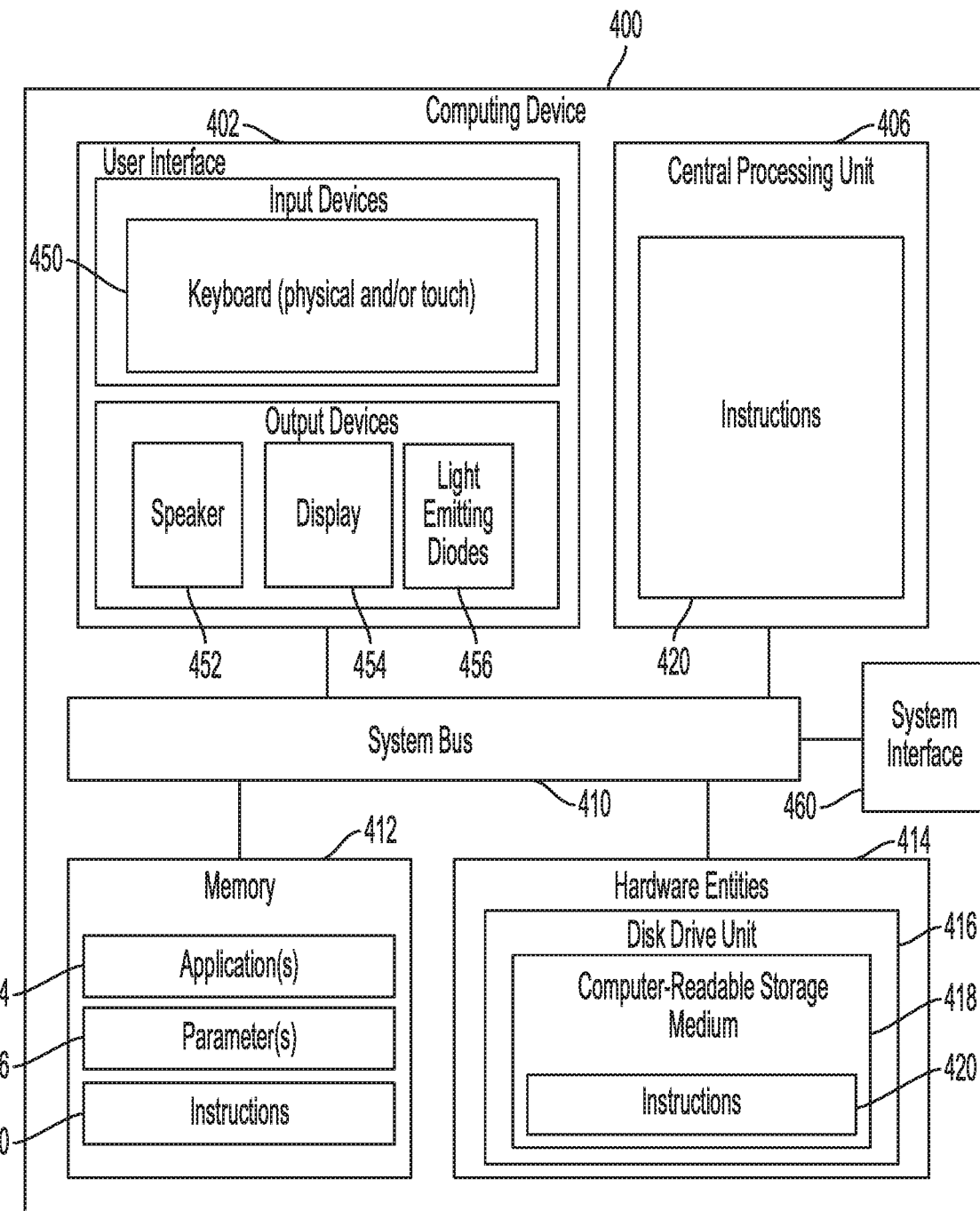
FIG. 4 is an illustration of an illustrative computing device.

Referring now to FIG. 4, there is provided an illustration of an illustrative architecture for a computing device 400. The computing device 110 of FIG. 1 and/or the vehicle on-board computing device 220 of FIG. 2 is/are the same as or similar to computing device 300. As such, the discussion of computing device 300 is sufficient for understanding the computing device 110 of FIG. 1 and the vehicle on-board computing device 220 of FIG. 2.

Computing device 400 may include more or less components than those shown in FIG. 4. However, the components shown are sufficient to disclose an illustrative solution implementing the present solution. The hardware architecture of FIG. 4 represents one implementation of a representative computing device configured to operate a vehicle, as described herein. As such, the computing device 400 of FIG. 4 implements at least a portion of the method(s) described herein.

Some or all components of the computing device 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the computing device 400 comprises a user interface 402, a Central Processing Unit ("CPU") 406, a system bus 410, a memory 412 connected to and accessible by other portions of computing device 400 through system bus 410, a system interface 460, and hardware entities 414 connected to system bus 410. The user interface can include input devices and output devices, which facilitate user-software interactions for controlling operations of the computing device 400. The input devices include, but are not limited to, a physical and/or touch keyboard 450. The input devices can be connected to the computing device 400 via a wired or wireless connection (e.g., a Bluetooth® connection). The output devices include, but are not limited to, a speaker 452, a display 454, and/or light emitting diodes 456. System interface 460 is configured to facilitate wired or wireless communications to and from external devices (e.g., network nodes such as access points, etc.).

At least some of the hardware entities 414 perform actions involving access to and use of memory 412, which can be a Random Access Memory ("RAM"), a disk drive, flash memory, a Compact Disc Read Only Memory ("CD-ROM") and/or another hardware device that is capable of storing instructions and data. Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the computing device 400. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the computing device 400 and that cause the computing device 400 to perform any one or more of the methodologies of the present disclosure.

Figure 5:
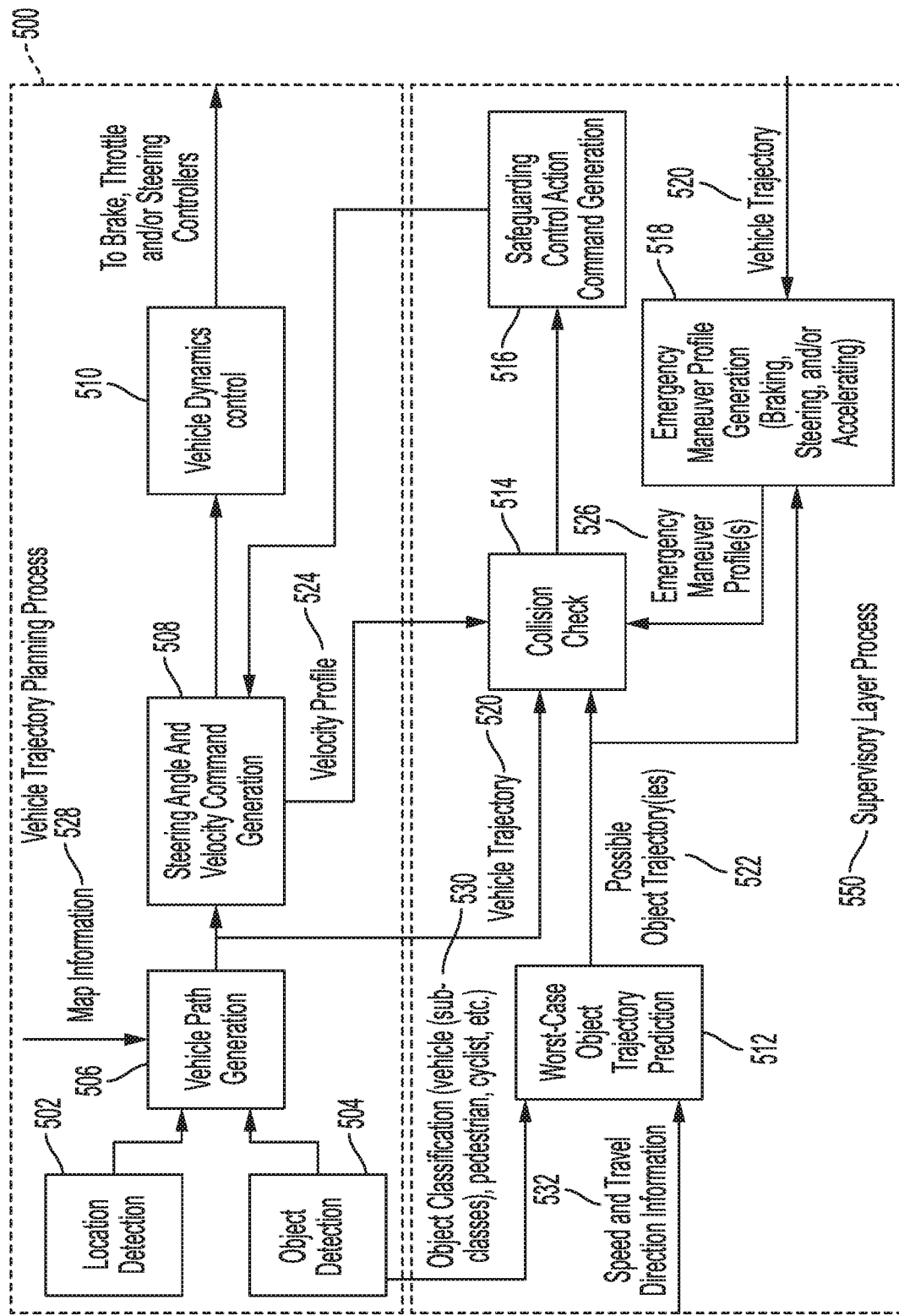
FIG. 5 provides a block diagram that is useful for understanding how vehicles control is achieved in accordance with the present solution.

Referring now to FIG. 5, there is provided a block diagram that is useful for understanding how vehicles control is achieved in accordance with the present solution. All of the operations performed in blocks 502-518 can be performed by the on-board computing device of a vehicle (e.g., AV 102$_1$ of FIG. 1).

In block 502, a location of the vehicle is detected. This detection can be made based on sensor data output from a location sensor (e.g., location sensor 248 of FIG. 2) of the vehicle. This sensor data can include, but is not limited to, GPS data. The detected location of the vehicle is then passed to block 506.

In block 504, an object is detected within proximity of the vehicle. This detection is made based on sensor data output from a LiDAR system (e.g., LiDAR system 264 of FIG. 2) and a camera (e.g., camera 262 of FIG. 2) of the vehicle. The manner in which the object detection is achieved will become evident as the discussion progresses. Information about the detected object is passed to block 506 This information includes, but is not limited to, an initial predicted trajectory of the object, a speed of the object, a full extent of the object, a heading of the object, a direction of travel of the object, and/or a classification of the object. The full extent of the object and the heading of the object can be specified by a cuboid defined in a 3D graph on which the LiDAR data points are plotted. The plotted LiDAR data points form a 3D point cloud. The initial predicted object trajectory can include, but is not limited to, a linear path pointing in the heading direction of the cuboid.

This object detection information output from block 504 can be subsequently used to facilitate at least one autonomous driving operation (e.g., object tracking operations, object trajectory prediction operations, vehicle trajectory determination operations, and/or collision avoidance operations). For example, a cuboid can be defined for the detected object in a 3D graph comprising a LiDAR dataset. The cuboid heading and geometry can be used to predict object trajectories in block 512 as discussed below and/or determine a vehicle trajectory in block 506 as discussed below. A worst-case predicted objected trajectory can be identified and used to trigger emergency maneuvers in blocks 514-518 as discussed below. The present solution is not limited to the particulars of this example.

In block 506, a vehicle trajectory is generated using the information from blocks 502 and 504. Techniques for determining a vehicle trajectory are well known in the art. Any known or to be known technique for determining a vehicle trajectory can be used herein without limitation. For example, in some scenarios, such a technique involves determining a trajectory for the AV that would pass the object when the object is in front of the AV, the cuboid has a heading direction that is aligned with the direction in which the AV is moving, and the cuboid has a length that is greater than a threshold value. The present solution is not limited to the particulars of this scenario. The vehicle trajectory 520 can be determined based on the location information from block 502, the object detection information from block 504, and map information 528 (which is pre-stored in a data store of the vehicle). The vehicle trajectory 520 may represent a smooth path that does not have abrupt changes that would otherwise provide passenger discomfort. For example, the vehicle trajectory is defined by a path of travel along a given lane of a road in which the object is not predicted travel within a given amount of time. The vehicle trajectory 520 is then provided to block 508.

In block 508, a steering angle and velocity command is generated based on the vehicle trajectory 520. The steering angle and velocity command is provided to block 510 for vehicle dynamics control.

Notably, the present solution augments the above-described vehicle trajectory planning process 500 of blocks 502-510 with an additional supervisory layer process 550. The additional supervisory layer process 550 optimizes the vehicle trajectory for the most likely behavior of the objects detected in block 504, but nonetheless maintains safety if worst-case behaviors occurs. This additional supervisory layer process 550 is implemented by blocks 512-518.

As shown in FIG. 5, an object classification is performed in block 504 to classify the detected object into one of a plurality of classes and/or sub-classes. The classes can include, but are not limited to, a vehicle class and a pedestrian class. The vehicle class can have a plurality of vehicle sub-classes. The vehicle sub-classes can include, but are not limited to, a bicycle sub-class, a motorcycle sub-class, a skateboard sub-class, a roller blade sub-class, a scooter sub-class, a sedan sub-class, an SUV sub-class, and/or a truck sub-class. The object classification is made based on sensor data generated by a LiDAR system (e.g., LiDAR system 264 of FIG. 2) and/or a camera (e.g., camera 262 of FIG. 2) of the vehicle. Techniques for classifying objects based on LiDAR data and/or imagery data are well known in the art. Any known or to be known object classification technique can be used herein without limitation. Information 530 specifying the object's classification is provided to block 512, in addition to the information 532 indicating the object's actual speed and direction of travel.

Block 512 involves determining one or more possible object trajectories for the object detected in 504. The possible object trajectories can include, but are not limited to, the following trajectories:

a trajectory defined by the object's actual speed (e.g., 1 mile per hour) and actual direction of travel (e.g., west);

a trajectory defined by the object's actual speed (e.g., 1 mile per hour) and another possible direction of travel (e.g., south, south-west, or X (e.g., 40°) degrees from the object's actual direction of travel in a direction towards the AV) for the object;

a trajectory defined by another possible speed for the object (e.g., 2-10 miles per hour) and the object's actual direction of travel (e.g., west); and/or a trajectory defined by another possible speed for the object (e.g., 2-10 miles per hour) and another possible direction of travel (e.g., south, south-west, or X (e.g., 40°) degrees from the object's actual direction of travel in a direction towards the AV) for the object.

The possible speed(s) and/or possible direction(s) of travel may be pre-defined for objects in the same class and/or sub-class as the object. The one or more possible object trajectories 522 is(are) then passed to block 514. The system may cause the vehicle's speed and steering controllers to move the vehicle according to the defined trajectory as discussed below.

In the case that two or more possible object trajectories are determined, then 512 may optionally also involve selecting one of the possible object trajectories which provides a worst-case collision scenario for the AV. This determination is made based on information 532 indicating the AV's actual speed and direction of travel. The selected possible object trajectory is then passed to block 514, instead of all the possible object trajectories determined in 512.

In block 514, a collision check is performed for each of the possible object trajectories 522 passed to block 514. The collision check involves determining whether there is an undesirable level of risk that a collision will occur between the vehicle and the object. Such a determination is made by first determining if the vehicle trajectory 520 and a given possible object trajectory 522 intersect. If the two trajectories 520, 522 do not intersect, then the vehicle trajectory 520 is deemed to be a safe vehicle trajectory and no safeguarding control action is taken to modify the vehicle trajectory.

In contrast, if the two trajectories 520, 522 do intersect, then a predicted time at which a collision would occur if the two trajectories are followed is determined. The predicted time is compared to a threshold value (e.g., 1 second). If the predicted time exceeds the threshold value, then the vehicle trajectory 520 is deemed to be a safe vehicle trajectory and no safeguarding control action is taken to modify the vehicle trajectory.

If the predicted time is equal to or less than the threshold value, then a determination is made as to whether the collision can be avoided if (a) the vehicle trajectory is followed by the AV and (b) any one of a plurality of dynamically generated emergency maneuvers is performed in a pre-defined time period (e.g., N milliseconds). The dynamically generated emergency maneuvers include, but are not limited to, the following:

- an emergency maneuver that comprises a braking command and that is determined based on the vehicle trajectory and a possible object trajectory;
- an emergency maneuver that comprises at least a steering command, and a braking command or an acceleration command, and that is determined via a gradient descent from the active AV trajectory on an objective function which penalizes collision and/or ride discomfort; and/or
- an emergency maneuver that comprises a pre-defined emergency maneuver that has been optimized via a gradient descent from the active AV trajectory on an objective function which penalizes collision and/or ride discomfort.

In some scenarios, an emergency braking maneuver is produced by postulating a trajectory that maintains the intended trajectory for the pre-defined time period (N milliseconds) and then decelerates at a maximum braking profile parameterized by maximum allowable deceleration and jerk limits. The maximum braking profile is produced along the original trajectory via Euler integration of a new velocity profile, or by other methods. The present solution is not limited to the particulars of these scenarios.

In those or other scenarios, an emergency maneuver that comprises both steering and braking is generated by: parameterizing both steering and braking with a limited set of spline points (e.g., 4 spline points for steering and 3 spline points for velocity); minimizing an objective function which penalizes collision and/or ride discomfort, as a function of those parameters, using conjugate gradient descent, Newton's method, Powell's method, or other existing method(s) for minimizing multivariate functions; and computing the trajectory corresponding from the parameterized spline points with the minimal objective function cost. The present solution is not limited to the particulars of these scenarios.

In those or other scenarios, a pre-defined emergency maneuver is generated by recording commands from a human operator during a simulated emergency braking event, or by sampling a small set of steering torques and braking profiles applied to the current vehicle state. These torques are computed at constant intervals from zero up until the limits of the steering and brake mechanism, or by other methods. The present solution is not limited to the particulars of these scenarios.

If it is determined that the collision can be avoided in the pre-defined time period, then the vehicle trajectory 520 is deemed to be a safe vehicle trajectory and no safeguarding control action is taken to modify the vehicle trajectory. Alternatively, the AV is caused to perform a cautious maneuver (e.g., mildly slow down such as by 5-10 mph). Techniques for causing an AV to take a cautious maneuver such as slowing down are well known in the art. For example, a safeguarding control action command is generated as shown by 516, and used to adjust or otherwise modify the vehicle trajectory at 508 prior to being passed to block 510. The vehicle trajectory can be adjusted or otherwise modified to cause the vehicle to decelerate, cause the vehicle to accelerate, and/or cause the vehicle to change its direction of travel.

In contrast, if it is determined that the collision cannot be avoided in the pre-defined time period, then the AV is caused to immediately take an emergency maneuver. This emergency maneuver may include one of the dynamically generated emergency maneuvers discussed above. Techniques for causing an AV to take emergency maneuvers are well known in the art.

Illustrative Methods For Control A Vehicle

Referring now to FIG. 6, there is provided a flow diagram of an illustrative method 600 for controlling a vehicle (e.g., vehicle $102_1$ of FIG. 1). At least a portion of method 600 is performed by a vehicle on-board computing device (e.g., vehicle on-board computing device 220 of FIG. 2). Method 600 is performed for each object (e.g., vehicle $102_2$ of FIG. 1, cyclist 104 of FIG. 1, and/or pedestrian 106 of FIG. 1) that has been detected to be within a distance range from the vehicle at any given time.

Method 600 comprises a plurality of operations 602-630. The present solution is not limited to the particular order of operations 602-630 shown in FIG. 6. For example, the operations of 620 can be performed in parallel with the operations of 604-618, rather than subsequent to as shown in FIG. 6.

Figure 6A:
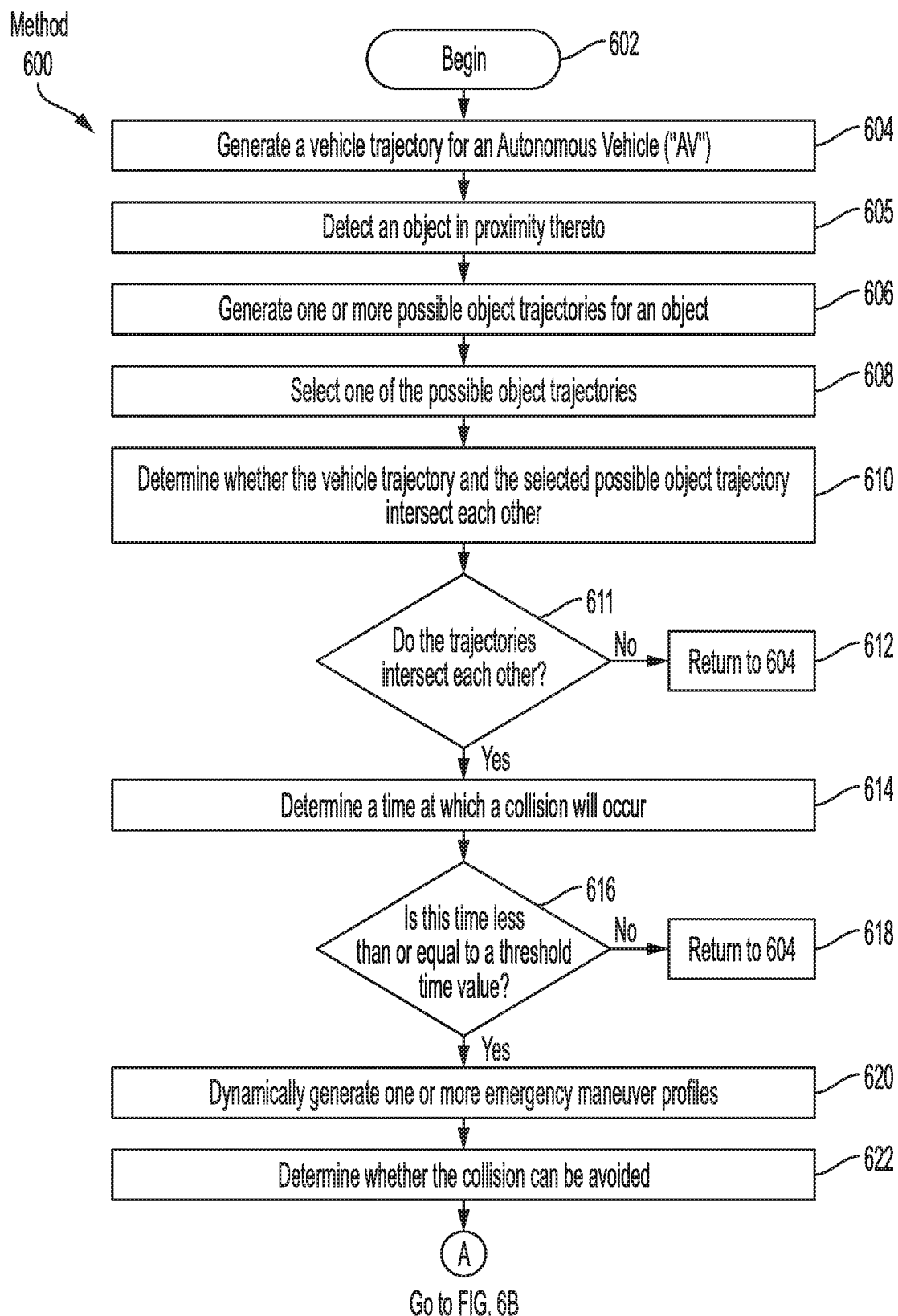
FIGS. 6A-6B (collectively referred to herein as "FIG. 6") provides a flow diagram of an illustrative method for controlling an autonomous vehicle using CLF object detection.

As shown in FIG. 6A, method 600 begins with 602 and continues with 604 where a vehicle trajectory (e.g., vehicle trajectory 520 of FIG. 5) for an AV is generated. The vehicle trajectory represents a smooth path that does not have abrupt changes that would otherwise provide passenger discomfort. Techniques for determining a vehicle trajectory are well known in the art. Any known or to be known technique for determining a vehicle trajectory can be used herein without limitation. In some scenarios, the vehicle trajectory is determined based on location information generated by a location sensor (e.g., location sensor 260 of FIG. 2) of the AV, object detection information generated by the on-board computing device (e.g., on-board computing device 220 of FIG. 2) of the AV, images captured by at least one camera (e.g., camera 262 of FIG. 2) of the AV, and map information stored in a memory (e.g., memory 412 of FIG. 4) of the AV. In other scenarios, lane information is used as an alternative to or in addition to the location information and/or map information.

Once the vehicle trajectory is generated, method 600 continues with 605 where the AV performs operations to detect an object that is in proximity thereto. A CLF object detection algorithm is employed in 605. The CLF object detection algorithm will be described in detail below. The object detection is then used to facilitate at least one autonomous driving operation (e.g., object tracking operations, object trajectory prediction operations, vehicle trajectory determination operations, and/or collision avoidance operations). For example, a cuboid can be defined for the detected object in a 3D graph comprising a LiDAR data set. The cuboid specifies a heading of the object and/or full extent of the object's geometry. The heading and object geometry can be used to predict an object trajectory and/or determine a vehicle trajectory, as is known in the art and discussed above. The present solution is not limited to the particulars of this example.

Accordingly, method 600 continues with 606 where one or more possible object trajectories (e.g., possible object trajectories 522 of FIG. 5) are determined for the object (e.g., vehicle 102$_2$, cyclist 104 or pedestrian 106 of FIG. 1) detected in 605. The possible object trajectories can include, but are not limited to, the following trajectories: a trajectory defined by the object's actual speed (e.g., 1 mile per hour) and actual direction of travel (e.g., west); a trajectory defined by the object's actual speed (e.g., 1 mile per hour) and another possible direction of travel (e.g., south, south-west, or X (e.g., 40°) degrees from the object's actual direction of travel in a direction towards the AV); a trajectory defined by another possible speed for the object (e.g., 2-10 miles per hour) and the object's actual direction of travel (e.g., west); and/or a trajectory defined by another possible speed for the object (e.g., 2-10 miles per hour) and another possible direction of travel (e.g., south or south-west or X (e.g., 40°) degrees from the object's actual direction of travel in a direction towards the AV). The possible speed(s) and/or possible direction(s) of travel may be pre-defined for objects in the same class and/or sub-class as the object.

Next in 608, one of the possible object trajectories is selected for subsequent analysis. In some scenarios, the operations of 610-628 are performed (e.g., in an iterative or parallel manner) for each possible object trajectory generated in 606. In other scenarios, the operations of 610-628 are performed for only one of the possible object trajectories which provides a worst-case collision scenario for the AV. This worst-case possible object trajectory is selected based on information indicating the AV's actual speed and direction of travel (e.g., generated by a speed sensor 238 of FIG. 2 and/or location sensor 260 of FIG. 2). A worst-collision scenario may include, but is not limited to, a collision scenario which is to occur sooner than all other collision scenarios provided by the possible object trajectories and/or is expected to result in serious injury or death (e.g., a high speed, side-impact collision or a high speed, head-on collision). In yet other scenarios, the operations 610-628 are performed for two or more of the possible object trajectories which provide the top Z (e.g., 2 or 5) worst-case collision scenarios for the AV. Z is an integer selected in accordance with a particular application. The present solution is not limited to the particulars of these scenarios.

In next 610, a determination is made as to whether the vehicle trajectory generated in 604 and the possible object trajectory selected in 608 intersect each other. If the two trajectories do not intersect each other [611:NO], then 612 is performed where method 600 returns to 604.

In contrast, if the two trajectories do intersect each other [611:YES], then method 600 continues to 614 where a time value is determined. This time value represents a time at which a collision will occur if the vehicle trajectory is followed by the AV and the possible object trajectory is followed by the object. The time value determined in 614 is then compared to a threshold time value, as shown by 616. The threshold time value is selected in accordance with a given application (e.g., one or more seconds). If the time value is greater than the threshold time value [616:NO], then 618 is performed where method 600 returns to 604. If the time value is equal to or less than the threshold time value [616:YES], then method 600 continues with 620-622. 620-622 involve: dynamically generating one or more emergency maneuver profiles based on the vehicle trajectory and the possible object trajectory; and determine whether the collision can be avoided if the vehicle trajectory is followed by the AV and any one of the emergency maneuvers is performed in a pre-defined time period (e.g., N milliseconds). Upon completing 622, method 600 continues with 624 of FIG. 6B.

Figure 6B:
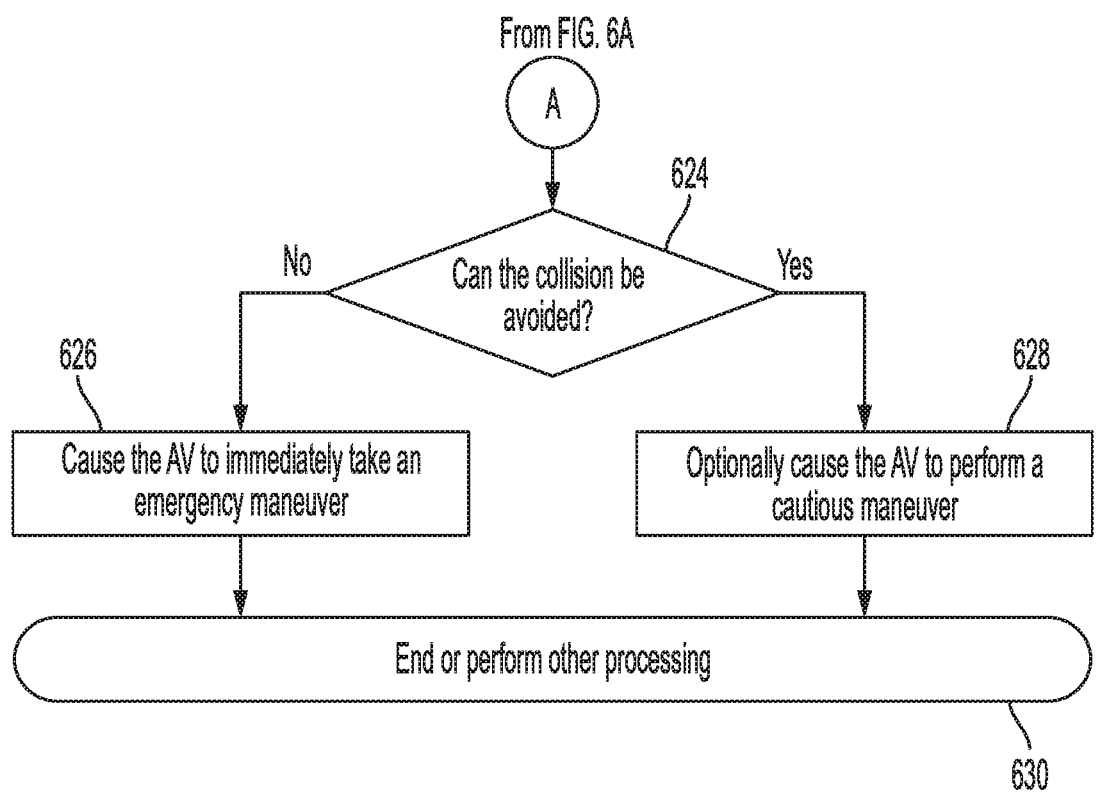

Referring now to FIG. 6B, if the collision cannot be avoided in the pre-defined time period [624:NO], then 626 is performed where the AV is caused to immediately take an emergency maneuver. The emergency maneuver can include, but is not limited to, one of the dynamically generated emergency maneuvers discussed above in relation to 620. Techniques for causing an AV to take emergency maneuvers are well known in the art. Any known or to be known technique for causing an AV to take emergency maneuvers can be used here. Subsequently, 630 is performed where method 600 ends or other processing is performed.

In contrast, if the collision can be avoided in the pre-defined time period [624:YES], then 628 is performed where the AV is optionally caused to perform a cautious maneuver (e.g., mildly slow down). Techniques for causing an AV to take a cautious maneuver such as slowing down are well known in the art. Any known or to be known technique for causing an AV to take a cautious maneuver can be used here. Subsequently, 630 is performed where method 600 ends or other processing is performed.

CLF Object Detection

The following discussion is directed to a novel solution for detecting objects. This novel solution may be performed in block 504 of FIG. 5 and/or block 605 of FIG. 6. The novel solution is referred to herein as a CLF based solution.

The purpose of CLF object detection is to detect objects in a LiDAR point cloud with added context from image detections. The AV may operate is a cluttered environment in which objects can move and interact with the AV and/or each other. In a pure LiDAR environment, this task is extremely difficult in situations when objects are in close proximity to each other and interact with each other. The CLF object detection takes full advantage of monocular camera image detections where detections are fused with the LiDAR point cloud. LiDAR data points are projected into the monocular camera frame in order to transfer pixel information to the LiDAR data points, as described above.

The transferred information can include, but is not limited to, color, object type and object instance.

There are several challenges when transferring labels from 2D image detections to a 3D LiDAR point cloud. In this regard, it should be noted that image pixels are not acquired at exactly the same time as LiDAR data points in the sweep wedge corresponding to the camera's FOV. The camera's exposure time window is usually much smaller than the time it takes for a LiDAR spinning assembly to sweep over the camera's horizontal FOV. This temporal alignment issue is most noticeable for moving objects having large angular velocity relative to the LiDAR system. It should also be noted that the LiDAR system is mounted at a different location than the monocular cameras. Due to a parallax issue there are regions of space perceived by the LiDAR system but not perceived by the camera, and vice versa. This makes label transfer ambiguous in cases where more than one LiDAR point project into the same region of the image. There are also issues with the accuracy and limited resolution of image detections masks, sensor calibrations errors, and the relative movement of the AV and actors.

The CLF based solution detects objects (e.g., objects $102_2$, 114 and/or 116 of FIG. 1) in a LiDAR point cloud with added context from image detections. The AV (e.g., AV $102_1$ of FIG. 1) must operate in a cluttered environment, where objects can move and interact. In a pure LiDAR environment, this task is extremely difficult in situations when objects are in close proximity to each other and also when objects interact. Typical segment detection approaches based on Euclidean point clustering struggle to detect separate objects that are in close proximity to each other. For example, pedestrians staying close to the vehicle, loading it or entering it are likely to be represented as a single pedestrian+vehicle segment—the points are close, but objects are separate. On the opposite side, a large object (such as a bus) can often be detected as multiple objects if it's partially occluded by other objects in front of it. Another challenge is that the large windowed area on the sides of the bus allows the light from the laser scanner to pass freely through the window and get returns from the objects inside the bus. This produces multiple fragments that actually belong to the same large object. Points are far apart, but they belong to the same object.

In the CLF based solution, monocular camera detections are fused with a LiDAR point cloud. Points of the LiDAR point cloud are projected into a monocular camera frame in order to transfer pixel information to each point in the LiDAR point cloud. The pixel information includes, but is not limited to, a color, an object type and an object instance. Notably, the cameras (e.g., cameras 262 of FIG. 2) of the AV may have overlapping Fields Of View ("FOV"). The LiDAR system's vertical FOV does not perfectly overlap with the vertical FOVs of the cameras. Therefore, some LiDAR points may be visible from multiple cameras and other points may not be visible from any of the cameras. To aid with temporal alignment, the cameras are configured to fire as a LiDAR system sweeps over the center of the camera's FOV. This time alignment error (e.g., the difference in time between LiDAR point capture and image capture) is used to compute a projection uncertainty, which is then used for LiDAR to Image Detection matching.

The camera image information is used as an additional cue to aid with LiDAR point segmentation. The distance function used to cluster LiDAR points is augmented to include a color and an image detection instance compatibility. This makes LiDAR points projecting into different object detections in the image to appear as if they are further apart to the segmentation algorithm. Similarly, LiDAR points that project into the same image detection mask appear closer. This approach provides profound improvement compared to the segmentation that relies on Euclidean distance between points alone in cases with different objects in close proximity to each other.

Segmentation: Any segmentation algorithm can be used by the present solution as long as it supports a customized distance function. In some scenarios, the segmentation algorithm used in the CLF based solution is LVS. For LVS, the present solution may include color distance and/or image detection instance compatibility in the distance function. The two major error modes of any segmentation algorithm are under-segmentation (multiple objects represented with a single segment) and over-segmentation (single object represented as multiple segments). In the CLF based solution, an optimization is performed for a minimal number of under-segmentation events at the cost of a high number of over-segmentation events. Over-segmentation events are then handled by a separate Segment Merger component.

Segment Merger: Any machine-learned classification technique can be employed by the present solution to learn which segments should be merged. The machine-learned classification technique includes, but are not limited to, an artificial neural network, a random forest, a decision tree, and/or a support vector machine. The machine-learned classification technique is trained to determine which segments should be merged with each other. The same image detection information that was used in segmentation is now aggregated over the constituent points of the segment in order to compute segment-level features. In addition to that the ground height and lane information features from HD map are also used to aid segment merging.

Segment Filter: Not all detected segments are relevant to the AV and many of them correspond to the clutter off the road (buildings, poles, garbage cans, etc.). This is where image detection information is used again to find relevant objects off the road. Because only tracking actors that can move off the road are only of interest, static objects can be safely discarded to improve the rest of the tracking pipeline latency and reduce its compute requirements. It is important to distinguish relevant objects (e.g., moving objects, or objects that can move and possibly intersect the AV path if start moving) from static objects (e.g., objects that are unlikely to move). Highly relevant objects may be assigned the highest priority in order to allocate limited onboard computation resources accordingly. Every image detection mask corresponds to a collection of LiDAR points inside a frustum in 3D space. The challenge here is that there are usually multiple objects at different depths projecting into the same image detection mask. An example is a vehicle detection with the pole in front of it and also a pedestrian behind it. LiDAR points that belong to the true pedestrian object and pole object will have points labeled as vehicle due to projection errors that occur during sensor fusion stage. These errors arise from difference in time when LiDAR point was acquired and when image pixel was acquired, parallax effect due to different positions of LiDAR and camera (LiDAR may see above the object seen by the camera), AV movement, actor movement, calibration errors, and/or accuracy and limited resolution of image detection masks. In order to resolve the ambiguity of image detection mask to segment association, projection characteristics are determined for all segments containing points that project into a particular image detection mask. Only 1 or a few best matches that are likely to correspond to the object detected on the image are reported. This helps eliminate clutter from the set of tracked objects and reduce tracking pipeline latency and computational requirements.

The present CLF based solution has many advantages. For example, the present CLF based solution takes full advantage of image detections but does not only rely on image detections or machine learning. This means both separating objects in close proximity and detecting objects that have not been recognized before. This approach combines ML image detections with classical methods for point cloud segmentation Over-Segmentation+Merge strategy is probably well known for image pixels, but may not be widely used when applied to LiDAR point clouds. In other words, many baseline LiDAR detection approaches either operate with a single cluster step, or employ deep learning methods. The proposed approach builds small clusters from low level features, but then extracts more meaningful features from the clusters to determine which clusters to merge in order to form objects Many learning based approaches use generic hand crafted features, or operate on the raw data (like the matching function in the Microsoft Kinect). The proposed approach incorporates several novel hand crafted features which are optimized for the objects in the environment (vehicles and vegetation).

Figure 7:
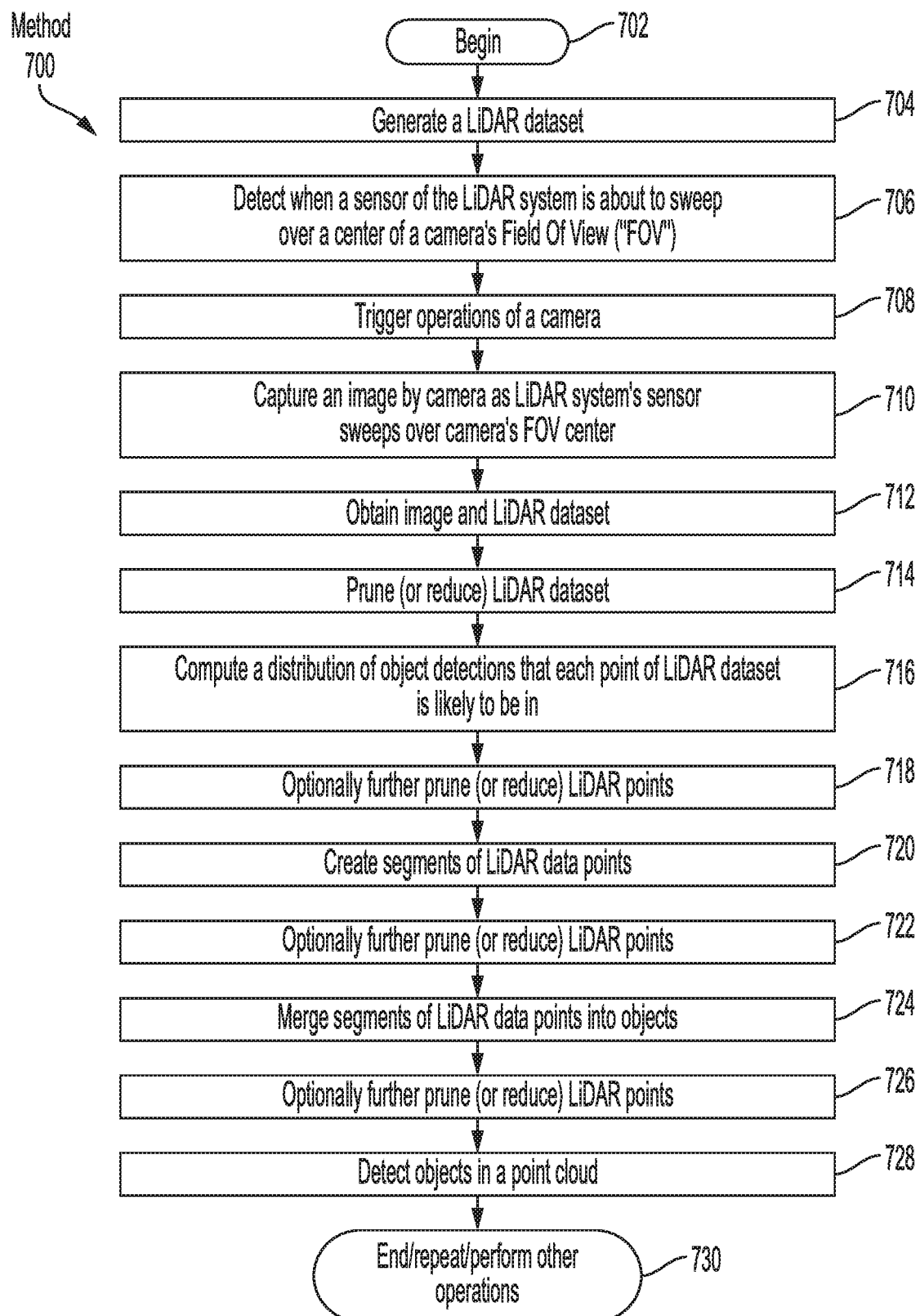
FIG. 7 provides a flow diagram of an illustrative method for CLF object detection.

Referring now to FIG. 7, there is provided a flow diagram of an illustrative method 700 for CLF based object detection. Method 700 begins with 702 and continues with 704 where operations are performed by a LiDAR system (e.g., LiDAR system 264 of FIG. 2) of the AV (e.g., AV $102_1$ of FIG. 1 and/or 200 of FIG. 2) to generate a LiDAR dataset. The LiDAR dataset measures a distance (contains distance, azimuth and elevation measurements) from the AV to at least one object (e.g., vehicle $102_2$ of FIG. 1) at a given time t. The LiDAR dataset comprises a plurality of data points that form a point cloud when plotted on a 3D graph. Techniques for generating LiDAR datasets are well known in the art. Any known or to be known technique for generating LiDAR datasets can be used here. In some scenarios, the LiDAR system continuously spins at 10 Hz and captures data at whatever its current angle is.

In 706, a detection is made as to when a sensor of the LiDAR system is about to sweep over a center of a camera's FOV. Operations of the camera (e.g., camera 262 of FIG. 2) are triggered when such a detection is made, as shown by 708. In 710, the camera captures an image as the LiDAR system's sensor sweeps over the center of the camera's FOV. The image includes content representing the location of a first object (e.g., vehicle $102_2$ of FIG. 1) at a given time t relative to the AV. The image is referred to herein as a camera frame or a monocular camera frame. In some scenarios, the camera is a global shutter (i.e., all pixels are captured at the same time) operating at 20 Hz. The operations of 706-710 aid with the temporal alignment of the camera's firing with the LiDAR system sweeping. The time alignment error (i.e., the difference in time between LiDAR point capture and image capture) is therefore minimized in the camera.

In 712, an on-board computing device (e.g., on-board computing device 220 of FIG. 2) of the AV performs operations to obtain the image and the LiDAR dataset. The on-board computing device then performs operations in 714-728 to detect objects in proximity to the AV using the image and the LiDAR dataset. 714-728 involve: pruning (or reducing) a total number of points contained in the LiDAR dataset; performing LiDAR-to-Image object detection operations to compute a distribution of object detections that each point of the LiDAR dataset is likely to be in; performing local variation segmentation using the outputs of the LiDAR-to-Image object detection operations to create a plurality of segments of LiDAR data points; performing segment merging operations to merge the plurality of segments of LiDAR data points into objects; and performing segment filtering operations to detect objects in the point cloud defined by the LiDAR dataset. Notably, the LiDAR points can be further pruned one or more times during the on-board computing device's processing of the image and LiDAR dataset as shown by 718, 722 and 726. This pruning can improve computational efficiency of the on-board computing device. Notably, the point pruning operations of 714, 718, 722 and 726 are described in detail in the following section entitled "Point Pruning" and in relation to FIG. 8. The LiDAR-to-Image object detection operations of 716 are described in detail in the following section entitled "LiDAR-to-Image Detection Matching" and in relation to FIGS. 9-14. The local variation segmentation operations of 720 are described in detail in the following section entitled "Local Variation Segmentation with Image Detection Features" and in relation to FIGS. 15-16. The segment merging operations of 724 are described in detail in the following section entitled "Segment Merger" and in relation to FIG. 17. The segment filtering operations of 728 are described in detail in the following section entitled "Object Detection Segment Filtering" and in relation to FIG. 18. Upon completing 728, 730 is performed where method 700 ends or other processing is performed.

Point Pruning

LiDAR datasets may contain a significant number of points. For instance, a LiDAR scanner (e.g., LiDAR sensor system 264 of FIG. 2) may produce a high density range image that contains more than 100,000 points every 100 ms. Processing each and every LiDAR data point can be prohibitively expensive in a real-time system. As such, limiting the number of LiDAR data points that are ultimately processed by the system for object detection purposes yields advantages including, without limitation, reduced energy consumption, reduced draws on hardware capacity, and reduced system latency. Accordingly, the present solution implements a method for pruning (or reducing) the number of LiDAR data points that are processed for purposes of detecting an object (e.g., AV $102_2$ of FIG. 1) that is located in proximity to an AV (e.g., AV $102_1$ or FIG. 1).

Figure 8:
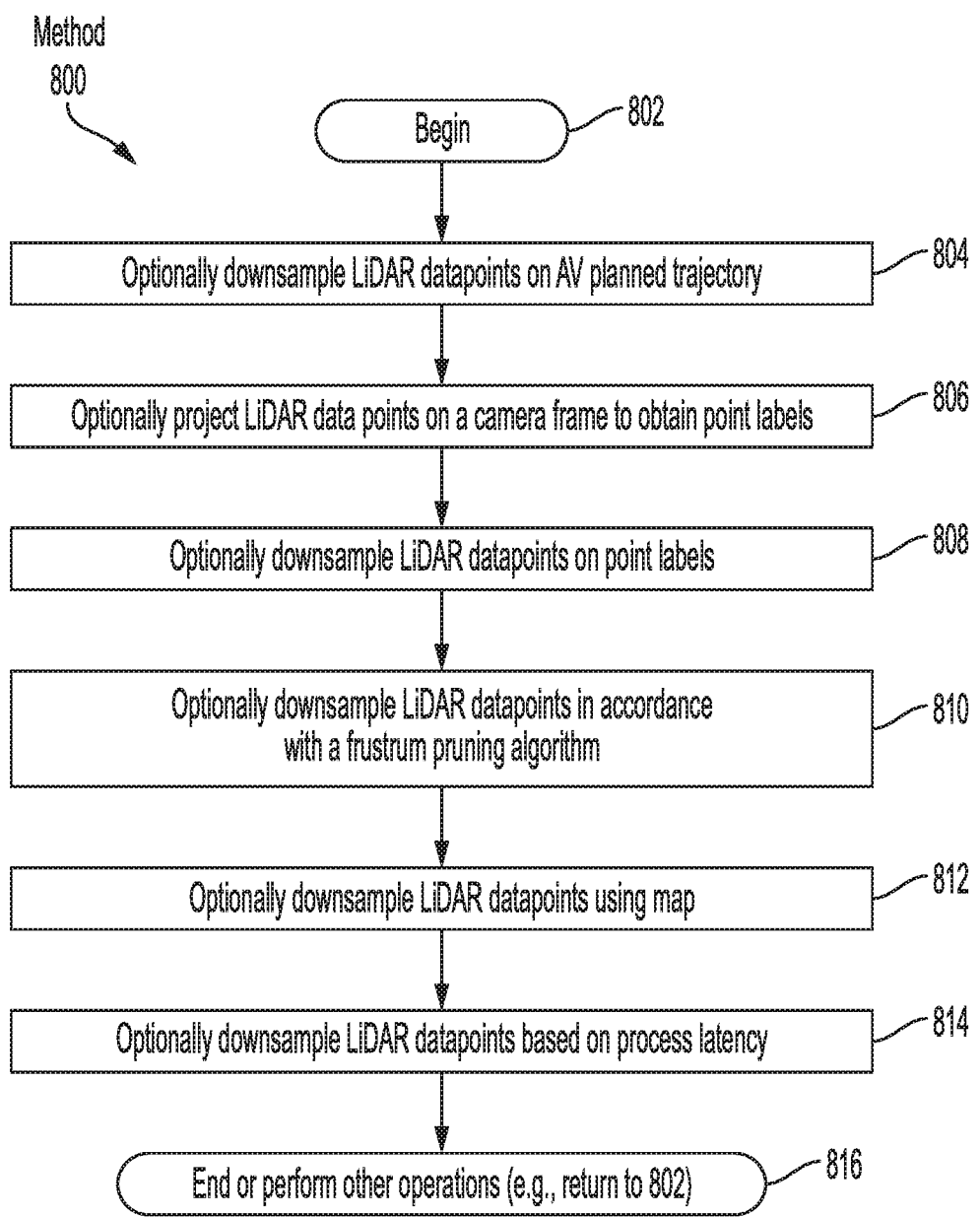
FIG. 8 provides a flow diagram of an illustrative method for pruning (or reducing) the number of LiDAR data points that are processed for purposed of detecting an object that is located in proximity to an AV.

Referring now to FIG. 8, there is provided a flow diagram of an illustrative method 800 for pruning (or reducing) the number of LiDAR data points that are processed for purposes of detecting an object (e.g., AV $102_2$ of FIG. 1) that is located in proximity to an AV (e.g., AV $102_1$ or FIG. 1). Method 800 may be performed by an on-board computing device (e.g., on-board computing device 220 of FIG. 2) and/or a remote computing device (e.g., computing device 110 of FIG. 1). The operations of method 800 may be performed in the same or different order in accordance with a given application. Also, method 800 may be absent of one or more operations in accordance with a given application. In this regard, it should be understood that one or more of the below described criteria for downsampling LiDAR data points can be employed during a given application. It should also be understood that the operations of 804-814 may be performed at different points during an object detection process. For example, the downsampling operations of 804 can be performed in 714 of FIG. 7. The downsampling operations of 806-808 can be performed in 714 and/or 718. The downsampling operations of 810 can be performed in 718 of FIG. 7. The operations of 812 can be performed in 714 and/or 722 of FIG. 7. The operations of 814 can be performed in 714, 718, 722 and/or 726 of FIG. 7. The present solution is not limited to the particulars of this example.

As shown in FIG. 8, method 800 begins with 802 and continues with optional 804 where the LiDAR dataset is downsampled based on a planned trajectory of an AV. For example, downsampling is performed for LiDAR data points corresponding to a region of interest along a planned trajectory of the AV at a lower rate than the LiDAR data points corresponding to other regions that are not along the planned trajectory of the AV. Downsampling may additionally or alternatively be performed for LiDAR data points corresponding to regions that are not of interest along the planned trajectory at a higher rate than the LiDAR data points corresponding to a region of interest. A region of interest may be a region that includes LiDAR data points corresponding to at least one object that is likely to interfere with the AV when following the planned trajectory (e.g., a region that includes a vehicle, a bicycle and/or a pedestrian along the planned trajectory of the AV). Regions that are not regions of interest may include LiDAR data points that correspond to at least one object that is unlikely to interfere with the AV when following the planned trajectory. This object may include, but is not limited to, a parked vehicle on the side of a road, and a vehicle to the rear of the AV that is traveling in the opposite direction as the AV.

In optional 806, LiDAR data points of the LiDAR dataset are projected into a camera frame (or image) in order to transfer information from the image-based object detections to the LiDAR data points. Techniques for projecting LiDAR data points into a camera frame are well known in the art. Any known or to be known technique for projecting LiDAR data points into a frame can be used here without limitation. One known projection technique implements a naive projection algorithm that is defined by mathematical equation (1) provided below. The transferred information is referred to herein as point labels. A point label refers to an indication or description associated with a LiDAR data point that includes information or data particular to that LiDAR data point. For instance, a point label may include an object class identifier (e.g., a vehicle class identifier, a pedestrian class identifier, a tree class identifier, and/or a building class identifier), a color (e.g., an RGB value), at least one unique identifier (e.g., for the object, corresponding image pixel(s), and/or LiDAR data point), and/or an object instance identifier (e.g., if there are many objects of the same class detected in an image).

In optional 808, the system (e.g., system 100 of FIG. 1 and/or 200 of FIG. 2) may downsample a LiDAR dataset based on the associated point labels. For example, points of a LiDAR dataset are partitioned into two or more classes based on the point labels associated with the points of the LiDAR dataset. For example, LiDAR data points may be separated into two classes, namely a first class containing LiDAR data points assigned high importance labels and a second class containing LiDAR data points assigned low importance labels. High importance labels may comprise labels that are important to track with a high accuracy. The high importance label is assigned to LiDAR data points with, for example, object class identifiers associated with a vehicle class, a pedestrian, a bicycle, or other moving object class. Low importance label is assigned to LiDAR data points with, for example, object class identifiers that are associated with static object classes (e.g., a building class, a foliage class, a construction barrier class, and/or a signage class). The low importance labels may be less important than high importance labels to track with a high degree of accuracy. The LiDAR dataset is then downsampled based on the importance labels of the points in the LiDAR dataset (as determined by their corresponding point labels). For example, LiDAR data points having high importance labels are not downsampled, or are alternatively downsampled with a high resolution. LiDAR data points having low importance labels are downsampled more aggressively than the LiDAR data points having high importance labels, i.e., with a lower resolution. The present solution is not limited to the particulars of this example.

In optional 810, the LiDAR dataset is downsampled in accordance with a frustum pruning algorithm. A LiDAR dataset may include points that correspond to objects (e.g., other vehicles, pedestrians, cyclists, and/or signs) located on a road or other path of travel (e.g., bike trail or path), and/or points that correspond to objects (e.g., buildings, trees and/or other foliage) located off road or other path of travel. A frustum may be generated for one or more the detected objects. The frustum corresponding to an image detection bounding box encompasses LiDAR data points of a point cloud that are likely to correspond to a particular object. The LiDAR data points that project within or in proximity to the image detection bounding box may be of more relevance or importance to the object detection process than the LiDAR data points that project further away from the bounding box since the LiDAR data points located further away from the bounding box are unlikely to correspond to objects of interest (e.g., pedestrian, bike, vehicle, etc.). As such, the LiDAR data points may be further downsampled and/or pruned based on their distances from the bounding box. For example, pruning is performed for the LiDAR data points that are located more than a threshold distance away from the bounding box. If the distance is less than or equal to the threshold distance, then the point remains in the LiDAR dataset. If the distance is greater than the threshold distance, the point is removed from the LiDAR dataset. The present solution is not limited to the particulars of this example. If in addition to the image detection bounding box, the image object boundary is known (in the form of a pixel mask for example), then (instead of using the distance to the bounding box) the distance to the mask can be used instead of the distance to the bounding box. The decision as to whether to keep the point in the dataset is determined based on whether the point projects into the dilated mask.

In optional 812, the LiDAR dataset is downsampled using a map that includes information associated with a trajectory of an AV (e.g., AV $102_1$ of FIG. 1). For instance, an AV may have a planned trajectory or path of travel that it is autonomously following. The map includes various information that corresponds to the planned trajectory or path of travel. This information may include, but is not limited to, information about lane placement, surface gradient, road boundaries, and/or locations of stationary objects. The map may be stored and/or retrieved from a datastore (e.g., memory 412 of FIG. 4) of the AV. One or more points of the LiDAR dataset may be identified for downsampling relative to the map. More specifically, downsampling is performed for LiDAR data points that are located below a minimum height threshold value on the map. For example, an assumption is made that most LiDAR points of interest to an AV correspond to objects that have heights that exceed a certain height measurement (e.g., two feet). Points are removed from the LiDAR dataset that are associated with heights less than the minimum height threshold value (e.g., two feet). An assumption may also be made that most LiDAR points of interest to an AV correspond to objects that have heights below a maximum height threshold value (e.g., 100 feet). Thus, points are removed from the LiDAR dataset that are associated with heights exceeding the maximum threshold value. The present solution is not limited to the particulars of this example.

In optional 814, the points of the LiDAR dataset are downsampled based on process latency. An object detection pipeline may employ multiple algorithms that have different time complexity characteristics. The entire pipeline latency as a function of input data size may be a non-linear curve. Analysis of latency data from vehicle logs may provide insights on how the function looks. For example, the function may be a linear function and/or a higher order function (e.g., polynomial). By accumulating data, a pipeline latency model is created. The pipeline latency model is then utilized to estimate latency given a certain input data size, and may use this estimated latency to manipulate downampling resolution. Subsequently, 816 is performed where method 800 ends or other operations are performed.

LiDAR-to-Image Detection Matching

The LID matching algorithm of the present solution has multiple aspects. These aspects include: (i) synchronizing camera firing with LiDAR system sweeping; (ii) accounting for projection uncertainty with known camera calibration uncertainties; and (iii) determining which image detection of a plurality of image detections each point in a LiDAR dataset is most likely to be in. As noted above, aspect (i) is achieved by triggering image capturing when a focal point of the LiDAR sensor is aligned with a center of the camera's FOV. This time alignment error (i.e., the difference in time between LiDAR point capture and image capture) is minimized by this synchronization. Aspect (ii) involves: determining an uncertainty in camera calibration based on eleven calibration parameters (i.e., 5 intrinsic: an xy focal length, a skew, an xy image center; 6 extrinsic: XYZ translation, 3 degrees of freedom rotation); projecting the uncertainty into a camera frame; and determining a distribution of pixels to which a LiDAR point may project (instead of a single pixel). Aspect (iii) is achieved by: considering each object detection as an independent measurement; and using the confidences to compute a distribution of detections in which a LiDAR point is likely to be. Aspects (i)-(iii) allow the LID matching algorithm to account for several sources of error and uncertainty to better match LiDAR points with camera-space objects.

Accordingly, the LID matching algorithm takes into account both projection uncertainty and the full confidence information in image detections. Presently, no projection uncertainty is considered and image detection confidences (in the whole detection and per-pixel in the mask) are binarized. Object type estimation would be updated to take the new matching into account.

There are two major issues with the conventional LID matching algorithms, mask bleed/mask erosion and mask shift. The present solution solves both of these issues by estimating $p(lp_i \in d_j)$ (where $lp_i$ represents a LiDAR point i and $d_j$ represents an image detection J), instead of providing the image detections that a LiDAR point naively projects into. This probability estimation takes into account image detection confidences, projection uncertainty, and the interaction of multiple overlapping masks. There are several known sources of projection uncertainty such as camera intrinsics, camera-to-LiDAR extrinsics, and time alignment (due to errors in motion compensation (e.g., a bump in the road is not well tracked by pose) and due to object movement).

This change requires a change to the current single-frame object type estimation. Instead of a bitset-counting method, the present solution computes an object type distribution for each image detection that a LiDAR point may project into. The set of object type distributions are then combined using the estimated probability for each image detection. A naïve method might be, for a point in multiple image detections, to average the type distribution for each image detection. The present solution is a weighted average, weighted by the likelihood of each image detection into account.

Figure 9:
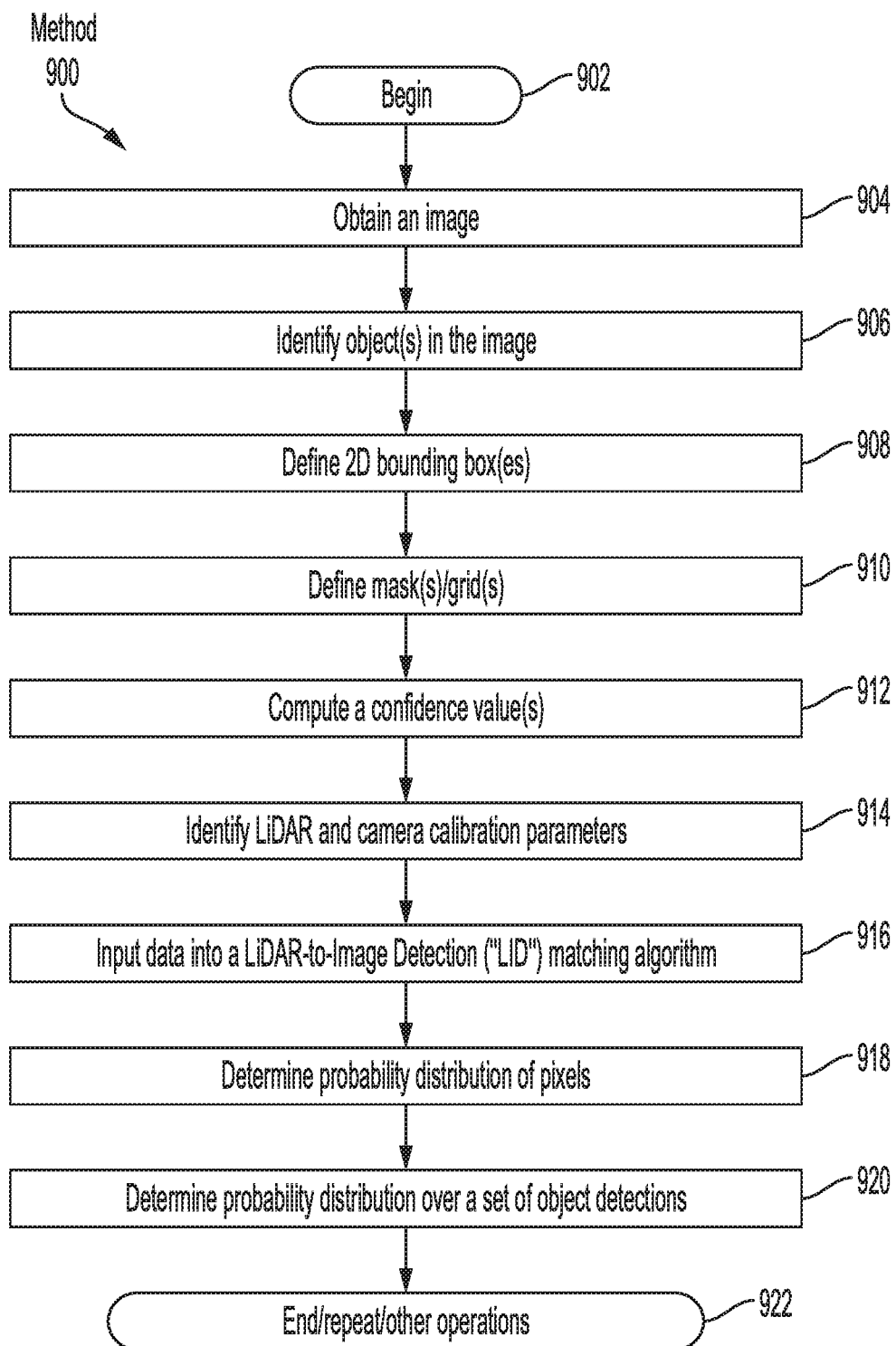
FIG. 9 provides a flow diagram of an illustrative method for performing a LiDAR-to-Image Detection ("LID") matching algorithm.
Figure 10:
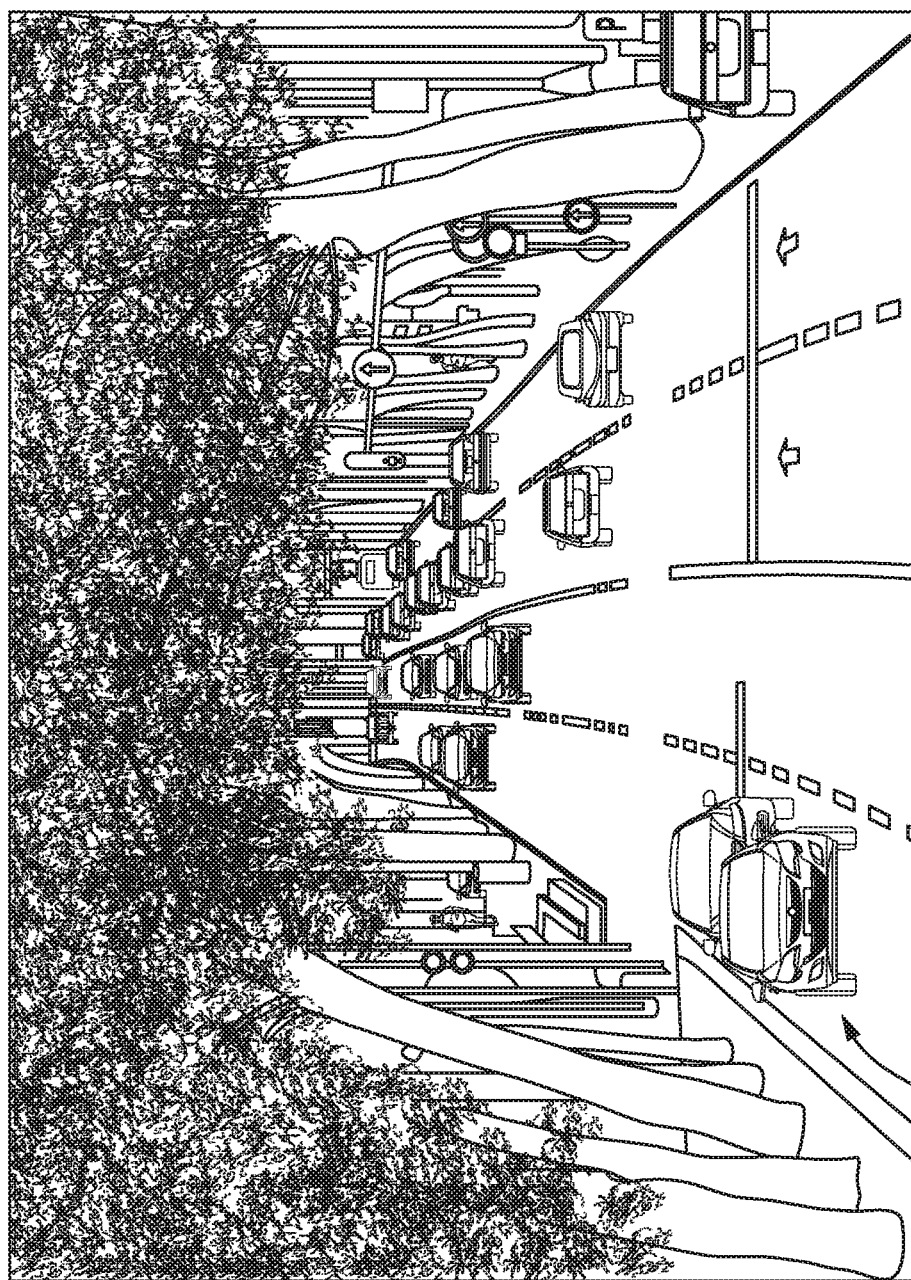
FIG. 10 provides an illustrative image captured by a camera of a vehicle.
Figure 11:
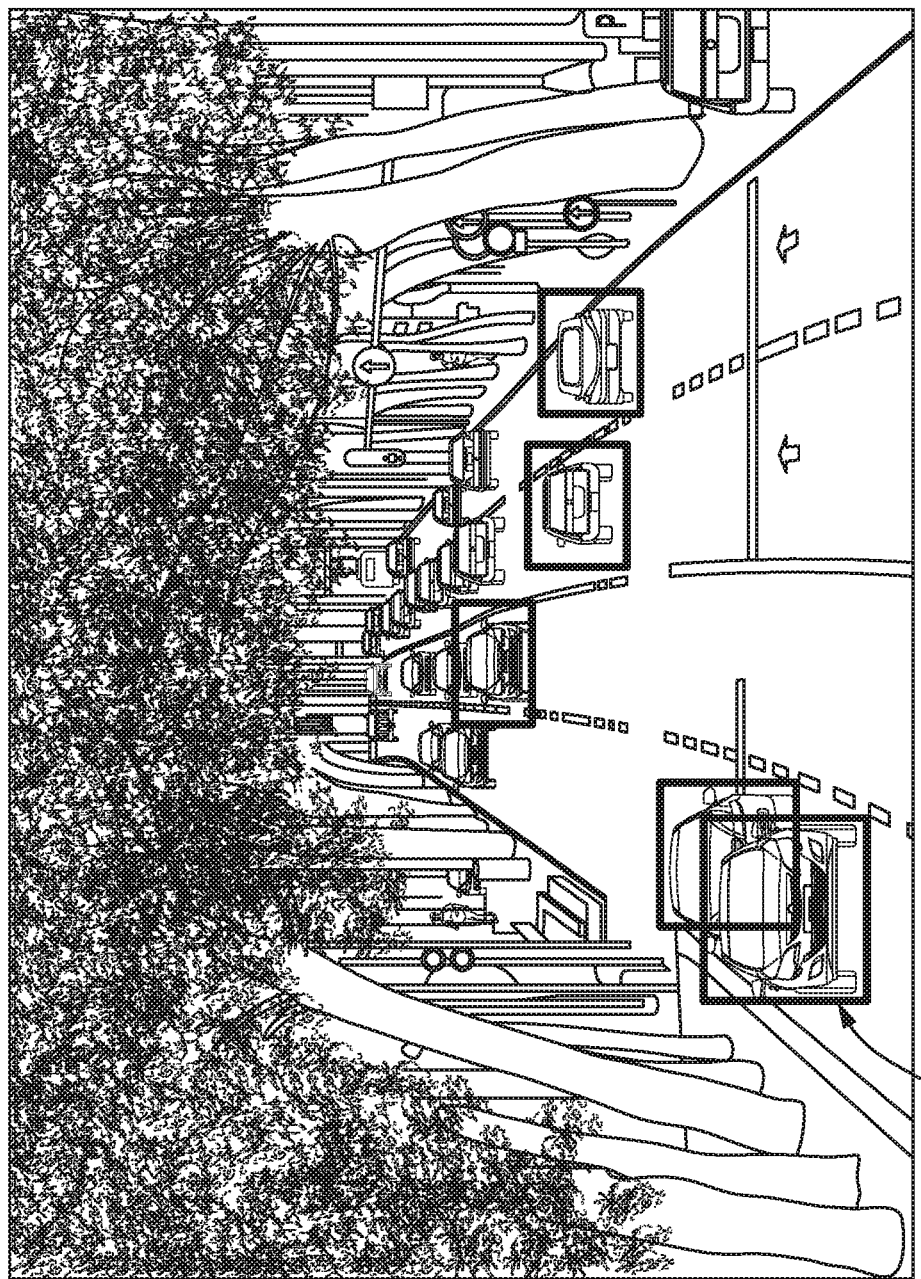
FIG. 11 provides an illustrative image having a plurality of bounding boxes overlaid thereon.

Referring now to FIG. 9, there is provided a flow diagram of a method 900 for performing the LID matching algorithm. Method 900 begins with 904 where an image (e.g., image 1000 of FIG. 10) is obtained by an on-board computing device (e.g., on-board computing device 220 of FIG. 2) of an AV (e.g., $AV_{1021}$ of FIG. 1). Method 900 continues with image analysis operations 906-912. These image analysis operations 906-912 may be performed by a Commercial-Off-The-Shelf ("COTS") image analyzer implementing a conventional object detection algorithm. 906-912 generally involve: identifying one or more objects (e.g., vehicle $102_2$ of FIG. 1, cyclist 114 of FIG. 1, pedestrian 116 of FIG. 1, and/or vehicle 1002 of FIG. 10) in the image; defining a two dimensional bounding box (e.g., bounding box 1100 of FIG. 11) encompassing each identified object; defining a mask (or grid) (e.g., mask 1200 of FIG. 12) for each two dimensional bounding box; and computing a confidence value for each cell of the mask (or grid) that the pixel(s) therein belong to a given detected object. Technique for computing confidence values for object detection purposes are well known in the art.

In 914, the on-board computing device determines or obtains extrinsic LiDAR sensor and camera calibration parameters and intrinsic camera calibration parameters. The extrinsic LiDAR sensor and camera calibration parameters include, but are not limited to, LiDAR sensor coordinates, and/or information indicating a correspondence between LiDAR sensor coordinates and camera coordinates. The intrinsic camera calibration parameters include, but are not limited to, an x focal length, a y focal length, a skew, an image center, a focal center of the image, and/or 3D coordinates (x, y, z) of a camera position.

In 916, various information is input into a LID matching algorithm. This information includes, but is not limited to, identifiers for each object detected in the image, mask identifiers, cell identifiers for each mask, confidence values for each cell, LiDAR point identifiers, LiDAR point coordinates, extrinsic LiDAR sensor and camera calibration parameters, and intrinsic camera calibration parameters. These inputs are used in subsequent operations 918-920 to: determine (for each point of the LiDAR dataset) a probability distribution of pixels to which a LiDAR data point may project taking into account a projection uncertainty in view of camera calibration uncertainties; and determine (for each point of the LiDAR dataset) a probability distribution over a set of object detections in which a LiDAR data point is likely to be, based on the confidence values. The operations of 918 are described in detail below in relation to FIG. 13. The operations of 920 are described in detail below in relation to FIG. 14. Subsequently, 922 is performed where method 900 ends or other operations are performed (e.g., return to 902).

Figure 13:
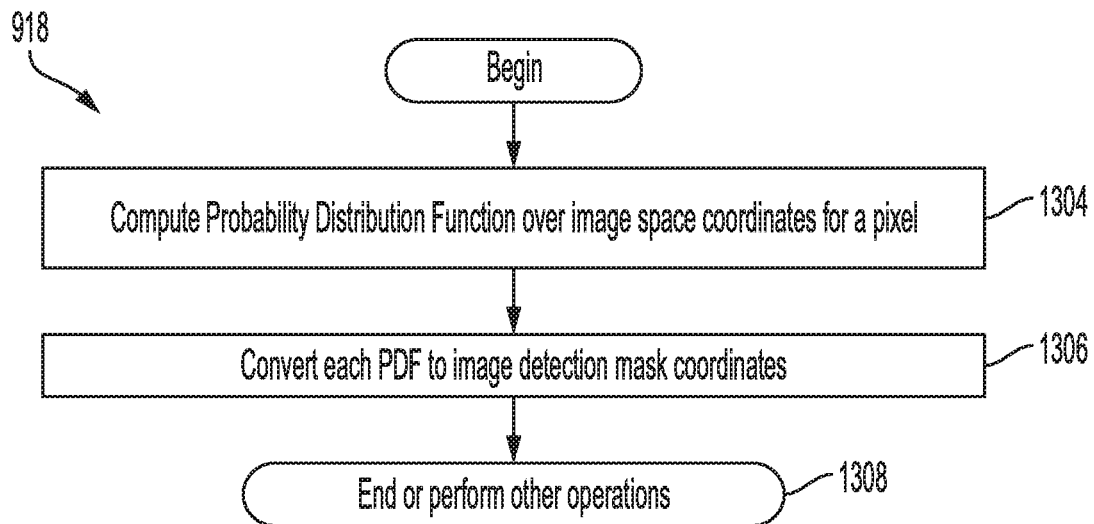
FIG. 13 provides a flow diagram of an illustrative method for determining a probability distribution of pixels to which a LiDAR data point may project taking into account a projection uncertainty.

As shown in FIG. 13, 918 of FIG. 9 involves a plurality of sub-operations 1304-1306. In 1304, the on-board computing device computes a Probability Distribution Function ("PDF") $f(x^i, y^i)$ over image space coordinates for a pixel to which a LiDAR point would probably project in accordance with a naive projection algorithm (i.e., a probability distribution that is centered around a naive projection point). The naive projection algorithm is defined by the following mathematical equation (1).

$$\begin{bmatrix} x^i \\ y^i \\ 1 \end{bmatrix} = M_{int} T_{Vehicle}^{Camera} T_{LiDAR}^{Vehicle} \begin{bmatrix} X \\ Y \\ Z \\ 1 \end{bmatrix} \quad (1)$$

where $x^i$ and $y^i$ represent image space coordinates for a pixel, and X, Y and Z represent LiDAR space coordinates for a point of the LiDAR dataset. Basically, each point of the LiDAR dataset is projected onto a pixel of an image that resides on the same line as the pixel, where a line is drawn from each pixel to a region of the image.

There are several sources of projection uncertainty, such as time alignment and object movement. If multiple sources of projection uncertainty are used, then each PDF for each LiDAR point is required to be: (i) representable in image space coordinates; (ii) convertible to image detection mask coordinates (can be translated and scaled); and (iii) composable (or combinable) with other projection uncertainty PDFs. The present solution uses a Jacobian of the PDF to propagate an uncertainty from LiDAR-frame to camera-frame. This (or a similar alternative for propagating uncertainty) helps satisfy requirement (i) for probability distribution.

The PDF is then converted to image detection mask coordinates, as shown by 1306. This conversion is achieved via translation and scaling (where the scaling in x and the scaling in y are independent). The conversion is defined by the following mathematical equation (2).

$$x^m = R \frac{x^i - x_{bbox}^-}{x_{bbox}^+ - x_{bbox}^-} \quad (2)$$

where $x_{bbox}^+$ and $x_{bbox}^-$ represent the image space boundaries of a bounding box and R is a mask resolution.

Figure 14:
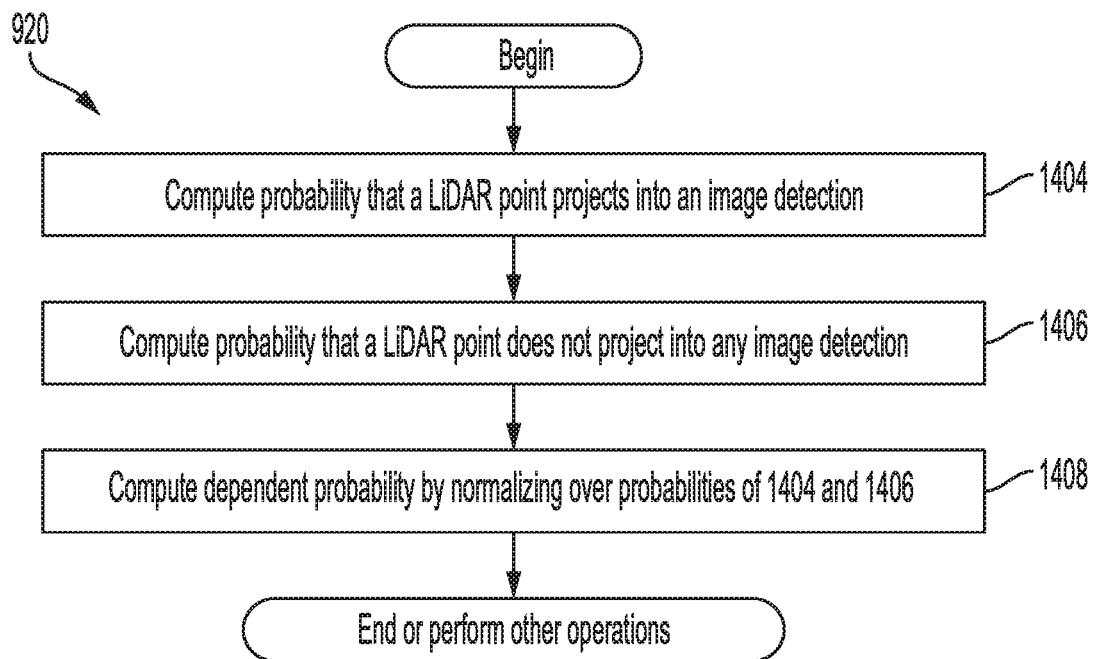
FIG. 14 provides a flow diagram of an illustrative method for determining a probability distribution over a set of object detections in which a LiDAR data point is likely to be.

As shown in FIG. 14, 920 of FIG. 9 involves performing various operations 1404-1408. In 1404, the on-board computing device computes a probability that a LiDAR point $lp_i$ projects into a given image detection $d_j$ (e.g., $d_1$) independent of all other image detections (e.g., $d_2, \ldots, d_{10}$). The probability is expressed as $i_p(lp_i \in d_j)$. At this point, a PDF $f(x^m, y^m)$ exists for a likely LiDAR point projection over image detection mask coordinates. The image detection confidence $c_d$ and the per-pixel confidences $c_x m, _y m$ are considered in this computation. These confidences are in [0, 1] but are not probabilities. A mapping in applied to compute a probability p(d) from $c_d$ and a probability p(mp∈d) from $c_x m, _y m$, where mp represents a mask pixel. The mapping can include, but is not limited to, a logistic function. The per-pixel confidences in the image detection mask are for the whole mask pixel (no infinitesimal coordinates). So, the on-board computing device computes the probability that a LiDAR point projects into a specific image detection mask pixel in accordance with mathematical equation (3).

$$p(lp \in mp) \int_{mp} f(x^m, y^m) = dmp = \int_{x_{mp}^-}^{x_{mp}^+} \int_{y_{mp}^-}^{y_{mp}^+} f(x^m, y^m) dy dx \quad (3)$$

where lp is a LiDAR point, mp is a mask pixel, $[x_{mp}^-, x_{mp}^+]$ represent the x limits of a pixel in mask coordinates, $[y_{mp}^-, y_{mp}^+]$ represents they limits of the pixel in mask coordinates, dmp represents a mask pixel associated with a given object detection d, dy represents y-axis coordinate for a mask pixel associated with the given object detection d, and dx represents an x-axis coordinate for the mask pixel associated with the given object detection d. This probability p(lp∈mp) is then used by the on-board computing device to compute the probability that the LiDAR point is in the image detection independent of all other image detections. This computation is defined by the following mathematical equation (4).

$$[\backslash bbox?] ip(lp \in d) = p(d) \sum_{mask} p(lp \in mp) p(mp \in d) = \quad (4)$$
$$p(d) \sum_{x=0}^{R} \sum_{y=0}^{R} p(lp \in mp_{x,y}) p(mp_{x,y} \in d)$$

where the mask resolution is R by R. For each point, this probability is computed for each detection the LiDAR point may project into. In some scenarios, the probabilities may sum up to greater than one. An assumption is made that a LiDAR point can only project into a single image detection. Thus, each independent probability is treated as an independent measurement (i.e., $i_p(lp \in d_1)$ is independent of $i_p(lp \in d_2)$).

The on-board computing device further computes the probability that the LiDAR point does not project into any image detection, as shown by 1406. This computation is defined by mathematical equation (5).

$$p(\forall d \; lp \notin d) = \prod_{dectections} [1 - ip(lp \in d)] \quad (5)$$

Finally in 1408, the on-board computing device computes a dependent probability by normalizing over all computed probabilities. This computation is defined by the following mathematical equation (6).

$$dp(lp \in d_i) = \quad (6)$$
$$p(\exists d \; lp \in d) dp(lp \in d_i \mid \exists d \; lp \in d) =$$
$$[1 - p(\forall d \; lp \notin d)] \frac{ip(lp \in d_i)}{\sum_{detections} ip(lp \in d)}$$

where ip(lp∈ d) represents a probability that that a point of the LiDAR dataset projects into an image detection independent of all other image detections and p(∀d lp∉d) represents a probability that the LiDAR point does not project into any image detection. The result of this computation represents the probability that a LiDAR point projects into a particular detection. For each LiDAR point, the LID matching algorithm outputs this probability for every detection that the LiDAR point may project into. That is, for each point, a sparse probability distribution over image detections is output from the LID matching algorithm. The sparse probability distribution represents the probability distribution over a set of object detections in which a LiDAR data point is likely to be.

Local Variation Segmentation with Image Detection Features

In some conventional object detection algorithms using a 3D LiDAR point cloud, small point cloud clusters are created that are very similar, and therefore are almost certainly in the same object. The point cloud clusters (fewer in number and having more context than single points) are merged into an object. Common methods for point cloud clustering are Connected Components and Density-Based Spatial Clustering of Applications ("DBSCAN"). Both of these methods only take into account local information (and not the larger context of the scene). A better method is Point Cloud Local Variation Segmentation ("PCLVS"), which combines local information with wider context. An illustrative PCLVS algorithm is discussed in a document entitled "Graph Based Over-Segmentation Methods for 3D Point Clouds", written by Yizhak Ben-Shabat et al. This document discusses using multiple features of a point (location, color based on an image, and direction of an estimated surface at the point). These features alone are not necessarily enough to keep two close objects from being merged together.

The present solution provides an improved LVS based algorithm that eliminates or minimizes the merging of close objects. This improvement is at least partially achieved through the use of additional features including (i) an image detection capability feature and (ii) a modified distance feature. Feature (i) is the difference between which image detections each point is in. Each point has a per-camera distribution of image detections that it's in (and the likelihood that it's not in any image detection). The information from all cameras are combined probabilistically into a single number that indicates whether the points are likely in the same image detection or not. Feature (ii) is an expanded or contracted height component of a geometric distance between points. Feature (ii) is provided to address the issues that point clouds do not have a uniform density of points and that there are fewer lasers pointed at the upper and lower ends of an object. Feature (i) and (ii) are combined in the LVS based algorithm with common features such as color similarity. Features (i) and (ii) provide a superior object detection capability, by being more likely to combine clusters that are in the same object and less likely to combine clusters that are not in the same object.

The conventional PCLVS algorithm handles segmentation in a wide variety of relatively easy and moderate scenarios for extracting objects from a point cloud, but does not currently perform as desired in challenging scenarios. This approach does not leverage other aspects of the information available from the LiDAR data, such as (i) the negative information provided by LiDAR returns passing through regions of the environment without interacting and (ii) the underlying structure of how the data is captured. This information can be used to improve performance of segmentation in ambiguous or challenging scenarios. Furthermore, the PCLVS approach attempts to largely produce segments which correspond 1:1 to objects in the world, without rigorously utilizing information outside the LiDAR returns to do so. This leads to an increase in segmentation errors, particularly under-segmentation errors. Under-segmentation errors are particularly difficult to solve after segmentation, due to the fact that splitting an under-segmented object requires implementing a second segmentation algorithm. Biasing towards over-segmentation provides two crucial benefits: an improvement in the ability to extract the boundaries which most critically impact motion planning for an AV; and allowing post-processing to reason about merging segments together, which is a fundamentally different algorithm. The present solution proposes a new LVS based segmentation approach which solves these problems: providing a framework for integrating additional information from the LiDAR sensors; defining the problem to ensure that the output is structured in a fashion which is more amendable to downstream processing; and improving performance by reducing under-segmentation and improving boundary recall.

Figure 15:
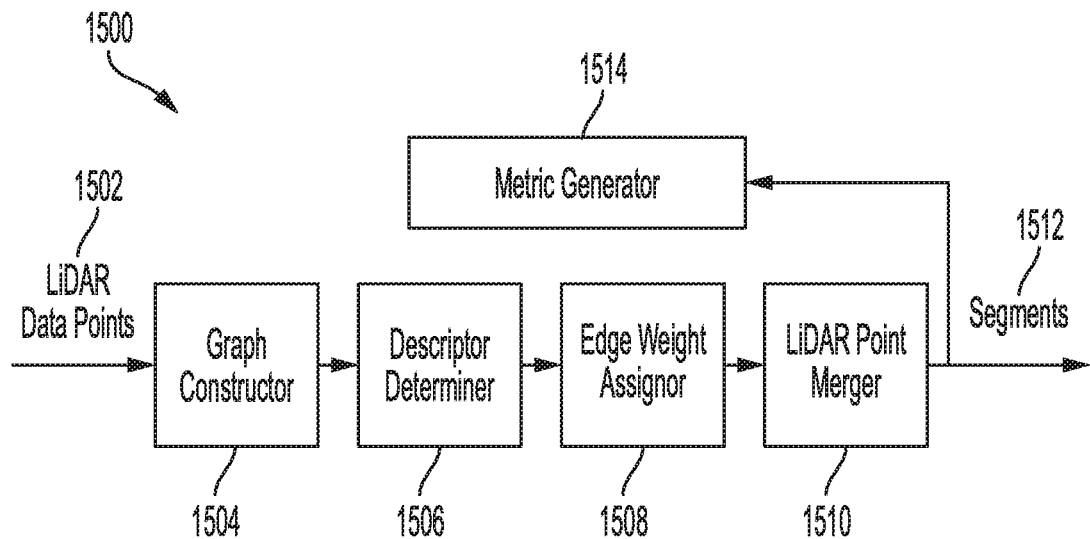
FIG. 15 provides an illustration that is useful for understanding the novel Local Variation Segmentation ("LVS") algorithm of the present solution.
Figure 16:
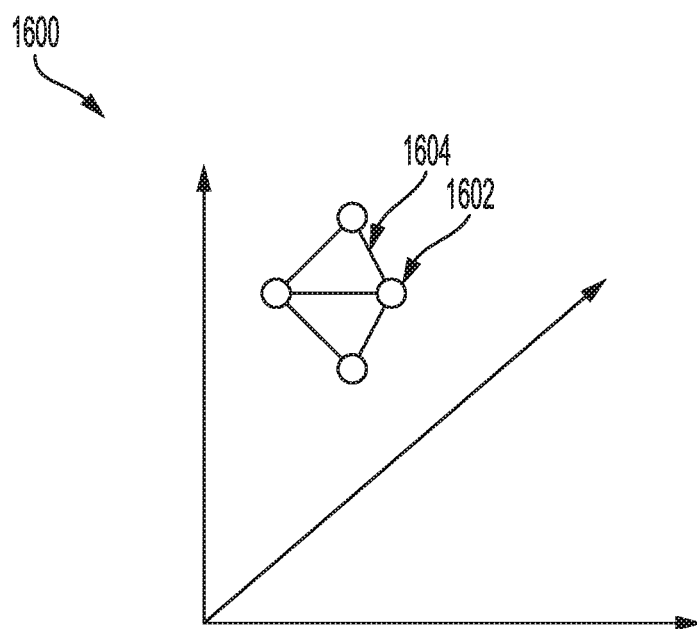
FIG. 16 provides an illustration showing a graph that is generated during the LVS algorithm of FIG. 15.

Referring now to FIG. 15, there is provided an illustration that is useful for understanding the novel LVS algorithm 1500 of the present solution. As shown in FIG. 15, LiDAR data points 1502 are input into the LVS algorithm 1500. The LiDAR data points 1502 are passed to a graph constructor 1504 where a connectivity graph is constructed by plotting the LiDAR data points on a 3D graph and connecting LiDAR data points. The LiDAR data point connections may be made based on whether two points are within a threshold spatial distance from each other, and/or whether two points are within a threshold temporal distance from each other. In other scenarios, each LiDAR data point is connected to its K-nearest neighbors. In yet other scenarios, a Delaunay triangulation is constructed and used as the connectivity graph. The connected LiDAR data points represent a proposed set of LiDAR data points that should be merged to form a segment 1512. An illustrative graph 1600 is provided in FIG. 16. As shown in FIG. 16, the graph 1600 has a plurality of nodes 1602 representing LiDAR data points or measurements. Connection lines 1604 have been added between the nodes 1602. The connection lines 1604 are also referred to herein as graph edges $e_{ij}$.

Next, a descriptor determiner 1506 determines a descriptor for each node 1602 (or LiDAR data point). The descriptor is a vector V of elements that characterize the node (or LiDAR data point). The elements include, but are not limited to, surface normals $N_i$, a per-point color value $(R_i G_i B_i)$ based on an image (e.g., image 1000 of FIG. 10), an intensity $I_i$, a texture $T_i$, spatial coordinates $(x_i, y_i, z_i)$, height above ground $H_i$, a probability distribution $cl_i$ over object classes for point (or node) image detections that they project into, a set of instance identifiers $\{id_i\}$, an image based feature $f_i$, and/or a Fast Point Feature Histogram $FPFH_i$. Each of the listed elements $R_i G_i B_i$, $I_i$, $T_i$, $(x_i, y_i, z_i)$ and $FPFH_i$ is well known in the art. Accordingly, the vector V may be defined by the following mathematical equation (7).

$$V=(N_i,R_iG_iB_i,I_i,T_i,(x_i,y_i,z_i),H_i,cl_i,id_i,f_i,\text{FPFH}_i, \ldots) \quad (7)$$

An edge weight assignor 1508 assigns weights to each graph edge $e_{ij}$. The graph edge comprises an edge feature $MD_i$. The modified distance $MD_i$ is an expanded or contracted height component of a geometric distance between nodes (or LiDAR data points). The modified distance MD may be defined by the following mathematical equation (8).

$$\omega_{md}(e_{ij}) = \frac{\sqrt{(X_i - X_j)^2 + (Y_i - Y_j)^2 + (f(H_i) - f(H_j))^2} - d_{min}}{d_{max} - d_{min}} \quad (8)$$

$$f(x) = \frac{a}{1 + e^{-kz}}$$

H is the point height above ground, a and k are constants for logistic function that compresses the Z axis distances when points are close to the ground.

The weights each represent a dissimilarity measure between two adjacent nodes 1602. A weight is computed for each type of element contained in the vector V. More specifically, a weight $w_n$ is computed for surface normal, which may be defined by the following mathematical equation (9).

$$w_n(e_{ij}) = 1 - \hat{N}_i \cdot \hat{N}_j \qquad (9)$$

A weight $w_c$ is computed for color, which may be defined by the following mathematical equation (10).

$$w_c(e_{ij}) = \frac{\sqrt{(R_i - R_j)^2 + (G_i - G_j)^2 + (B_i - B_j)^2}}{\sqrt{3}}. \qquad (10)$$

A weight $w_I$ is computed for intensity, which may be defined by the following mathematical equation (11).

$$w_i = \frac{|I_i - I_j|}{I_{max}} \qquad (11)$$

where $I_i$ and $I_j$ are LiDAR point intensities, and $I_{max}$ is the maximum possible intensity value. A weight $w_d$ is computed for 3D graph coordinates, which may be defined by the following mathematical equation (12).

$$w_d(e_{ij}) = \frac{\sqrt{(X_i - X_j)^2 + (Y_i - Y_j)^2 + (Z_i - Z_j)^2} - d_{min}}{d_{max} - d_{min}} \qquad (12)$$

where $d_{min}$ represents a minimum distance within the graph, and $d_{max}$ represents a maximum distance within the graph. A weight $w_{cl}$ is computed for $cl_i$, which may be defined by the following mathematical equation (13). The value of weight $w_{cl}$ may be 1 if the object classes are different, or −1 if the object classes are the same. A graph node may be composed of multiple LiDAR points. As noted above, $cl_i$ is the probability distribution over object classes for constituent points. Bhattacharyya distance can be used to compute the similarity between two probability distributions.

A weight $w_{FPFH}$ is computed for False Point Feature Histogram which may be defined by the following mathematical equation (14).

$$w_{FPFH}(e_{ij}) = 1 - \sum_{l=1}^{33} \min(FPFH_{i,l}, FPFH_{j,l}) \qquad (14)$$

A weight $w_{IDC}$ is computed for image detection capability which may be defined by the following mathematical equation (15).

$$IDC_{ij} = \left[ \sum_{c}^{C} \sum_{d}^{D_c} p(lp_i \in d) p(lp_j \in d) \right]_0^1 \qquad (15)$$

where c is the compatibility between points, C is the set of all cameras, $D_c$ is the set of image detections in C, and d is the clamping function.

A weight $w_{MD}$ is computed for modified distance which may be the same as $MD_{ij}$ above.

The above weights may be combined into one non-negative scalar $w(e_{ij})$ by, for example, linear combination. The information from all cameras are combined probabilistically into a single number that indicates whether the points are likely in the same image detection or not. The non-negative scaler $w(e_{ij})$ may be defined by the following mathematical equation (16).

$$w(e_{ij}) = k_n w_n(eij) + k_c w_c(eij) + k_I w_I(eij) + \qquad (16)$$
$$k_T w_T(eij) + k_d w_d(eij) + k_H w_H(eij) + k_{cl} w_{cl}(eij) + k_{id} w_{id}(eij) +$$
$$k_{FPFH} w_{FPFH}(eij) + k_{IDC} w_{IDC}(eij) + k_{MD} w_{MD}(eij) + \ldots$$

where $k_n$, $k_c$, $k_I$, $k_T$, $k_d$, $k_H$, $k_{cl}$, $k_{id}$, $k_{FPFH}$, $k_{IDC}$ and $k_{MD}$ are predefined constants. The scaler $w(e_{ij})$ is then assigned by the edge assignor 1508 as the edge weight for a given graph edge $e_{ij}$. The edge weights $w(e_{ij})$ are then passed to a LiDAR point merger 1510.

The LiDAR point merger 1510 uses the edge weights $w(e_{ij})$ to decide which LiDAR data points should be merged together to form segments 1512. The LiDAR points are merged based on these decisions. The output of the LiDAR point merger 1510 is a plurality of segments 1512. The segments 1512 are used in subsequent segment merging operations.

The iterative segment merging operations performed by the LiDAR point merger 1510 involve building segments by iteratively merging smaller segments, until a stopping condition is reached. Specifically, all nodes 1602 are initially considered individual segments, and all graph edges 1604 are sorted in ascending order by edge weight $w(e_{ij})$. The graph edges 1604 are considered in order, treating each graph edge as a merge proposal if the graph edge connects two different segments. A merge proposal is accepted if the weight between the two segments is less than a largest internal variation of the two segments, plus a term which biases segmentation to merge small segments. More formally, given segments $C_i$, $C_j$ connected by an edge $e_{ij}$ with a weight $w(e_{ij})$, $$w(e_{ij}) <= \min_{x \in \{i,j\}} \left( \max_{e \in MST(C_x)} w(e) + \frac{\delta}{|C_x|} \right) \qquad (17)$$

where $MST(C_X)$ defines a minimum spanning tree of C, and δ represents a parameter controlling a degree of segmentation which occurs. This threshold can be applied on a per-element basis or on a weighted sum of the weight defined for the graph edge. The final output 1512 is a segmentation of all observations into distinct clusters. Each of the segments 1512 comprises one or more LiDAR points.

In some scenarios, a metric generator 1514 is provided to collect, compute and/or generate segmentation metrics from the segmentation operation and output. In defining these, an assumption is made that a labeled ground truth is available for point clouds labelling all the objects which are of interest to the system. Note that since this segmentation approach is meant to detect all objects which should be avoided, labels should exist for obstacles which are not of interest to the detection system, but should be avoided (e.g., foreign-object debris, road signs, and/or garbage cans). The proposed metrics include an under-segmentation error metric, a boundary recall metric, and an instance precision and recall metric.

Under-segmentation error metric measures how much the segmentation results include segments which cross boundaries between distinct objects in the scene. Since an under-segmentation event involves two ground truth segments, this error metric must be computed such that it does not double count the event. The under-segmentation error metric can be computed by finding each segment which intersects more than one ground-truth object, and dividing the segment between the ground-truth objects. The under-segmentation error metric is then defined as the sum of the smaller of the two sub-segments for all these under-segmentations, averaged over the number of points across all segments. More formally, the under-segmentation error metric UE is defined by the following mathematical equation (18).

$$UE = \frac{1}{|GT|} \left( \sum_{S \in GT} \left( \sum_{P \in O \forall P \cap S \neq 0} \min(|P \setminus S|, |S \setminus P|) \right) \right) \quad (18)$$

where GT represents a set of ground truth labels, and O represents a set of computed labels.

The boundary recall metric measures a degree to which a boundary of each object is recovered by segmentation. Over-segmentation produces boundaries which are internal to ground truth segmentation, but are intrinsic to the performance improvements of the present approach. Thus, this metric aims to measure how many of the LiDAR data points which represent boundaries of objects are extracted by a given segmentation. This can be computed by projecting the 3D point cloud data into a depth image, and painting each pixel with an associated segment label. Boundaries can thus be computed by finding the edges in the image. The same process can be performed with the output segmentation, with edges then being labels as true positives (edges present in both images) and false negatives (edges present in the ground truth data, but not in the output segmentation). The boundary recall metric BR may be defined by the following mathematical equation (19).

$$BR = \frac{TP}{TP + FN} \quad (19)$$

A performance of extracting objects of interest can be computed as precision and recall metrics over object instances. For each object in the ground truth, a determination can be made as to whether a segment is majority associated with a ground truth label in the same fashion as is performed in under-segmentation error. With this information, precision and recall can be computed in a standard fashion.

Segment Merger

Notably, the segments 1512 output from the LVS algorithm 1500 are too small for estimating cuboids. As such, a segment merger is employed to construct segments large enough for subsequent shape prior (e.g., cuboid) estimation. The segment merger performs segment merging operations that generally involve: selecting pairs of segments; identifying which pairs of segments have a centroid-to-centroid distance greater than a threshold value (e.g., 3 m); computing features for each segment pair (which centroid-to-centroid distance less than the threshold value (e.g., <3 m)) based on the attributes of the segments contained in the pair; generating (for each segment pair) a probability that the segments should be merged based on the computed features; and merging segments based on the probabilities.

Figure 17:
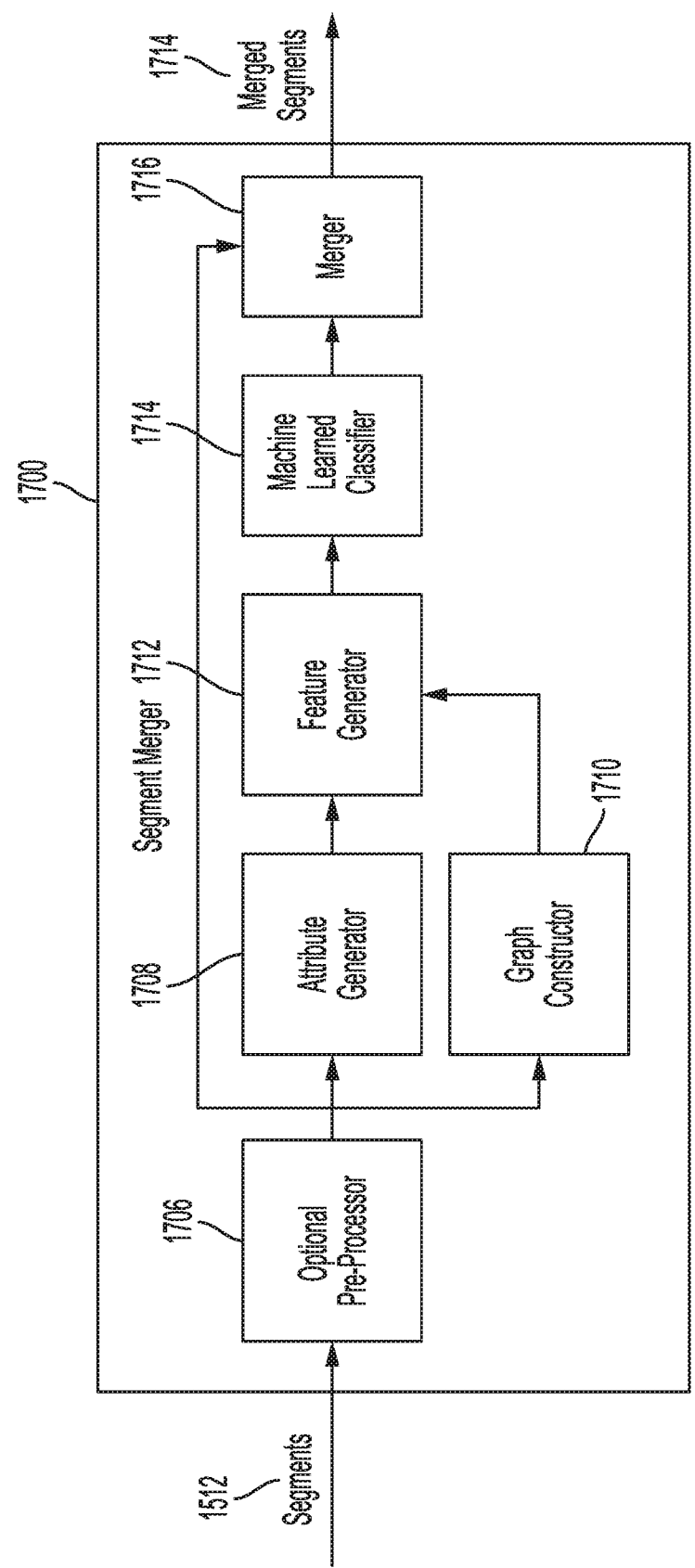
FIG. 17 provides an illustration of an illustrative architecture for a segment merger.

Referring now to FIG. 17, an illustration is provided of an illustrative segment merger 1700. The segments 1512 are input into the segment merger 1700. The segments 1512 may optionally be pre-processed in 1706. Pre-processing operations are well known in the art. The pre-processing can involve selecting pairs of segments, obtaining centroids for the segments, determining centroid-to-centroid distances for each pair of segments, identifying which pairs of segments have a centroid-to-centroid distance greater than a threshold value (e.g., 3 m), and removing the identified pairs of segments from further consideration for segment merging purposes. In some scenarios, the threshold values is defined as a sum of a first segments' radius from the centroid and a second segment's radius from the centroid plus a pre-defined constant (e.g., 0.5 m).

The remaining segments are passed to an attribute generator 1708 and a graph constructor 1710. At the attribute generator 1608, a set of attributes for each segment may be obtained and/or generated. A set of attributes can include, but is not limited to: (i) a 2D region that the LiDAR data points in the segment cover; (ii) an average of the probability distributions that were computed in 920 of FIG. 9 for the LiDAR data points contained in the segment; (iii) a percentage of LiDAR data points contained in the segment that are on a road; (iv) a percentage of LiDAR data points contained in the segment that are off a road; and/or (v) a total number of lanes that a segment at least partially overlaps. Attributes (i), (iii), (iv) and (v) may be determined using a road map, a lane map and/or other map. For example, attribute (i) is determined by identifying a region on the map where the segment resides. Attributes (ii) and (iii) are determined by identifying which LiDAR data points in a segment reside on a road contained in the map, and identifying which LiDAR data points in a segment do not reside on a road contained in the map. Attribute (iv) is determined by identifying which lanes in a map the LiDAR data points of segment cover, and counting the number of identified lanes.

At the graph constructor 1710, a graph is constructed in which the segments are plotted. Links are added to the graph for pairs of nearby-by segments (taking into account the size of each segment). These links define pairs of segments for which features should be generated by feature generator 1712.

In some scenarios, each set of features describes a pairing of two segments. The features may be generated using the attributes generated by attribute generator 1708. The features can include, but are not limited to:

difference between an average of a probability distributions that was computed in 920 of FIG. 9 for a first segment and an average of a probability distributions that was computed in 920 of FIG. 9 for a second segment;

difference in on-road proportions, or difference in a percentage of LiDAR data points contained in a first segment that are on a road and a percentage of LiDAR data points contained in a second segment that are on a road;

difference in off-road proportions (e.g., difference in a percentage of LiDAR data points contained in a first segment that are off a road and a percentage of LiDAR data points contained in a second segment that are off a road);

region compatibility (e.g., a degree of overlap between the 2D lanes which are covered by first and second segments);

lane compatibility (e.g., a degree of overlap between the lanes in which first and second segments are in) (e.g., If the sets of lanes overlap, then compatible. If neither segment is in any lanes, no information. If the sets of lanes do not overlap, then non-compatible);

difference between the total number of lanes that a first segment at least partially overlaps and the total number of lanes that a second segment at least partially overlaps;

a nearest distance between convex hulls (or points);

a Hausdoff distance between convex hulls (or points);

whether the convex hulls intersect;

a difference or distance in height between segments (e.g., If a height interval for each segment intersects, this distance is zero. Otherwise, this is the distance between a minimum height of a higher segments and a maximum height of a lower segment.);

mask compatibility which is defined by mathematical equation $$\frac{\sum_{c}^{C}\sum_{d}^{D} w_{1cd} * w_{2cd}}{\sum_{c}^{C} np_{1c} * np_{2c}},$$

where C represents a set of cameras, D represents a set of image detections, $w_{lcd}$ represents summed probabilities of points in segment 1 matching with image detection d in camera c, and $np_{lc}$ represents a total number of points in segment 1 that projected into camera c. This results in a number between 0 and 1 (because $$\forall c \in C, \cdot \sum_{d}^{D} w_{1cd} < np_{1c}$$

for any segment. This weights the contribution of each camera by the number of points that project into it;

dominant mask compatibility (If segments have a same dominant mask in any camera, then compatible. If segments have different dominant masks in any camera, then incompatible. If there is a tie, then compatibility is determined as (segment 1 points that project to segment 1 dominant mask)*(segment 2 points that project to segment 2 dominant mask.);

difference in object type distributions (e.g., earth-mover's distance);

average range of two segments (context feature);

smaller most likely object size;

shared most likely object type (e.g., If the most likely object type of each segment is the same, then that object type.);

object type compatibility (e.g., If there is any intersection in the types that any constituent point projects to, then compatible.);

dominant object type compatibility (e.g., If there is a dominant object type (most points project to a mask that is of a type) and this dominant type is the same for both segments, then compatible);

difference between area-related features (e.g., difference between a ratio of [sum of areas of segment convex hulls] to [area of merged segment convex hulls] for two segments); and difference of color histogram.

The features are then passed from the feature generator 1712 to the machine learned classifier 1714. The machine learned classifier 1714 analyzes each set of features to determine a probability that the corresponding segments should be merged. For example, a low probability for merging two segments is determined when (1) a difference between probability distribution averages exceeds a threshold value and (2) lane incompatibility exists. In contrast, a high probability exists when (1) a difference between probability distributions averages is less than a threshold value and (2) lane compatibility exists. The present solution is not limited in this regard. The probabilities could be assigned a numerical value (e.g., 0-10) in addition to or as an alternative to a level (e.g., low, medium, or high). The level or degree of probability can be determined by any combination of features selected in accordance with a given application.

The machine learned classifier 1714 is trained using a machine learning algorithm that learns when two segments should be merged together in view of one or more features. Any machine learning algorithm can be used herein without limitation. For example, one or more of the following machine learning algorithms is employed here: supervised learning; unsupervised learning; semi-supervised learning; and reinforcement learning. The learned information by the machine learning algorithm can be used to generate rules for determining a probability that two segments should be merged. These rules are then implemented by the machine learned classifier 1714.

The merge probabilities are then analyzed by the machined learned classifier 1714 to classify the pairs of segments as merge pairs or non-merge pairs. For example, a pair of segments is classified as a merge pair when the respective merge probability has a level of high or has a numerical value greater than a threshold value. In contrast, a pair of segments is classified as a non-merge pair when the respective merge probability has a level of low or has a numerical value less than a threshold value. The present solution is not limited to the particulars of this example.

The classifications are then passed to the merger 1716. The merger 1716 merges the segments in accordance with the classifications. For example, segments in each merge pair are merged together. Notably, redundant links are not evaluated for segment merging purposes. For example, if segment A should merge with segment B and segment B should merge with segment C, then the segment merger 1716 does not evaluate merging segment A with segment C. The present solution is not limited to the particulars of this example.

It should be noted that one issue that is difficult to deal with from a pairwise segment merging perspective is fragments of larger vehicles. For example, a large box truck may be observed as multiple fragments that are far apart. Due to projection uncertainty, these fragments often do not project into the same image detection mask as the back of the truck, and there is not enough context in order for the merger to combine these fragments based on the merge probabilities. Therefore, the merger 1716 performs additional operations to fit each large detected segment detected as vehicle (e.g., a back of the truck) to a shape model (e.g., a cuboid) in order to estimate the true extent of the detected object. Bounding box estimator may use ground height and lane information from onboard HD map, and visual heading from image detection. The estimated cuboid now has enough information to merge fragments based on their overlap area with the estimated cuboid. Another example where cuboids help is segmentation of the buses. A large window area allows laser light to pass through and scan the interior portions of the bus resulting in multiple fragments that are far away from the L-shape of the bus exterior. Upon completing the merge operations, the merger 1716 outputs a plurality of merged segments 1714.

Object Detection Segment Filtering

Not all detected segments of LiDAR data points are relevant to the AV, and many of the segments correspond to the clutter off the road (e.g., buildings, poles, and/or garbage cans). The image detections are used to find relevant objects off the road. Because only off-road moving actors are of interest, static objects can be safely discarded to improve the rest of the CLF object detection pipeline and reduce the CLF object detection algorithm's computational requirements.

Because of the label transfer issues, there are multiple segments of LiDAR data points inside the frustum corresponding to the image detection mask. There may be 0 or 1 true positive segments in this collection, and 0 to N false positive segments in this collection. Solving this association problem is a primary purpose of the CLF segment filter.

An example is a vehicle detection with a pole in front and also a pedestrian behind. LiDAR data points that belong to the true pedestrian object and the pole object will have points labeled as vehicles due to projection errors that occur during the sensor fusion stage. In order to resolve the ambiguity of image detection mask to segment association, projection characteristics are computed for all segments containing LiDAR data points that project into a particular image detection mask. One or more best matches are reported that are likely to correspond to the object detected on the image. This helps eliminate clutter from the set of tracked objects, and reduces tracking pipeline latency and computational requirements.

Figure 12:
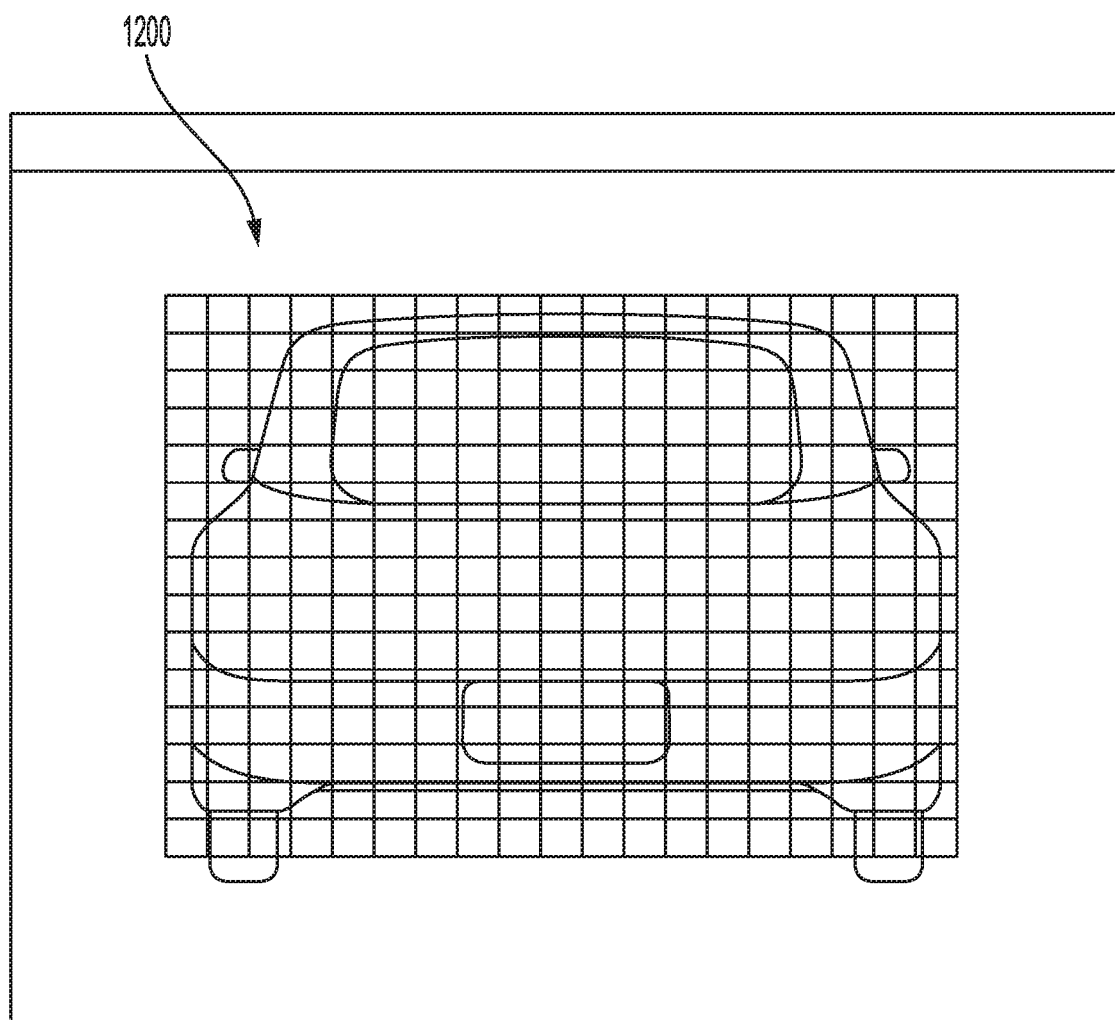
FIG. 12 provides an illustrative image having a bounding box and mask overlaid thereon.
Figure 18:
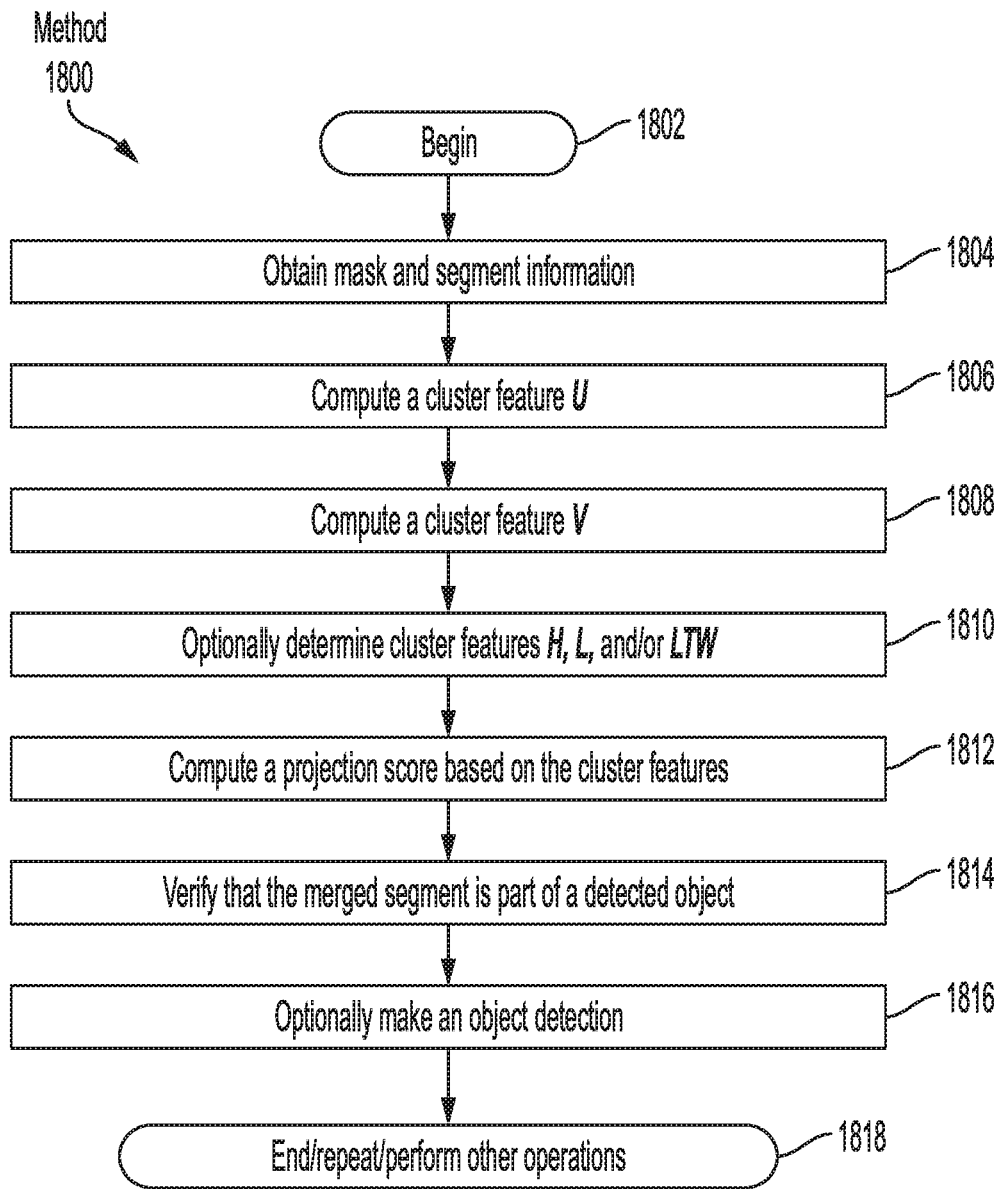
FIG. 18 provides a flow diagram of an illustrative method for object detection segment filtering.

Referring now to FIG. 18, there is provided a flow diagram of an illustrative method 1800 for object detection segment filtering. Input into a segment filter is a collection of candidate segments formed at earlier stages of the pipeline, where every candidate may or may not correspond to the real world object. For every segment, there would be two sets of points that form the segment. P point—points that project into the image detection mask. N points—points that don't project into the image detection mask, but in close proximity to the segment. The intuition behind adding nearby points, followed by geometric segmentation is that the projected points of a false cluster (such as a wall or a tree) will have many N points within close distance to P points which results in a single cluster containing both point categories. The resulting false cluster will contain a relatively small number of P points compared to the total number of points in the cluster. A true cluster, however, will mostly consist of P points with a relatively small number of N points. Thus, a cluster feature U is needed to discriminate true segments of LiDAR data points from false segments of LiDAR data points. The cluster feature U is defined by the following mathematical equation (20).

$$U = \text{count}(P)/(\text{count}(N) + \text{count}(P)) \tag{20}$$

where P represents a number of projected points in a cluster, and N represents a number of points in close distance to the points P. Sometimes when using the cluster feature U alone, cases may be encountered when it is not sufficient to identify true segments. For example, a larger true object (e.g., vehicle) may be occluded by a smaller false object (e.g., a pole). In this case, a smaller false object may consist entirely of P points while a vehicle cluster will have some mix of P points and N points. To help such cases, another cluster feature V is needed, and used in conjunction with cluster feature U to verify that the segment is correctly associated with a given object detection. The cluster feature V is defined by the following mathematical equation (21).

$$V = \text{count}(P)/\text{count}(D) \tag{21}$$

where D represents a total number of points that project into a particular image detection mask m (e.g., mask 1200 of FIG. 12). The D points are usually distributed across multiple objects in the world.

There are other cluster features that can be used to identify segments of LiDAR data points that are associated with a pedestrian, a vehicle, a bicyclist, and/or any other moving object. These additional cluster features include a cluster feature H representing a cluster height, a cluster feature L representing a cluster length, and a cluster feature LTW representing a length-to-width ratio for a cluster.

Clusters with a height above 2.0-2.5 meters are unlikely to be associated with pedestrians. Clusters over 1 meter in length are unlikely to be associated with pedestrians. Clusters with a length-to-width ratio above 4.0 often tend to be associated with buildings and are unlikely associated with pedestrians. Clusters with high cylinder convolution score are likely to be associated with pedestrians.

Accordingly, method 1800 begins with 1804 where various information for a given image detection mask m (e.g., mask 1200 of FIG. 12) is obtained (e.g., from memory 412 of FIG. 4). This information includes, but is not limited to, $P_m$ representing a number of points of a LiDAR data set that project into the mask m, Si representing a number of points forming a given merged segment s of LiDAR data points (e.g., merged segment 1714 of FIG. 17), $P^S_m$ representing a number of points in the given merged segment s projecting into the mask m, a height $h_s$ of a merged segment, a length $l_s$ of the merged segment, and/or a width $w_s$ of the merged segment. This information is used in 1806-1810 to determined one or more cluster features U, V, H, L, and/or LTW. Cluster feature U may be determined in accordance with the following mathematical equation (22), and cluster feature V may be determined in accordance with the following mathematical equation (23).

$$U = P^S_m/S_i \tag{22}$$

$$V = P^S_m/P_m \tag{23}$$

Cluster feature H is set equal to $h_s$. Cluster feature L is set equal to $l_s$. Cluster feature LTW may be determined by the following mathematical equation (24).

$$\text{LTW} = l_s/w_s \tag{24}$$

In 1812, a projection score PS is computed based on the cluster features U, V, H, L, and/or LTW. The projection score may be defined by the following mathematical equation (25).

$$PS = U*V*H*L*\text{LTW} \tag{25}$$

Notably, the present solution is not limited to mathematical equation (25). The projection score can represent the product of any combination of cluster features.

Next in 1814, the projection score is used to verify that the merged segment is part of the detected object associated with a given image detection mask. Such verification can be made when the projection score is greater than a threshold value. An object detection may be made in 1816 when such a verification is made. In some scenarios, the object detection is made based on the results of operations 1804-1814 for two or more merged segments that are associated with the same image detection mask. For example, an object detection is made that a given merged segment of a plurality of merged segments is associated with a given detected object when the PS computed for the given merged segment is greater than the PSs computed for the other merged segments of the plurality of merged segments. Subsequently, 1818 is performed where method 1800 ends or other processing is performed.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for controlling an autonomous vehicle, comprising:
    obtaining, by a computing device, a LiDAR dataset generated by a LiDAR system of the autonomous vehicle;
    using, by the computing device, the LiDAR dataset and at least one image to detect an object that is in proximity to the autonomous vehicle, the object being detected by matching points of the LiDAR dataset to pixels in the at least one image, and
    detecting the object in a point cloud defined by the LiDAR dataset based on the matching;
    using, by the computing device, the object detection to facilitate at least one autonomous driving operation,
    wherein the matching comprises determining a probability distribution of pixels of the at least one image to which a point of the LiDAR dataset may project taking into account a projection uncertainty in view of camera calibration uncertainties, and the probability distribution is determined by computing a probability distribution function over image space coordinates for a pixel to which a point of the LiDAR dataset would probably project and computed in accordance with following mathematical equation $$\begin{bmatrix} x^i \\ y^i \\ 1 \end{bmatrix} = M_{int} T_{Vehicle}^{Camera} T_{LiDAR}^{Vechile} \begin{bmatrix} X \\ Y \\ Z \\ 1 \end{bmatrix}$$

where $x^i$ and $y^i$ represent image space coordinates for a pixel, and X, Y and Z represent LiDAR space coordinates for a point of the LiDAR dataset.

2. The method according to claim 1, further comprising obtaining, by the computing device, at least one image that was captured at a time when a sensor of the LiDAR system swept over a center of a camera Field Of View ("FOV"), wherein the at least one image is used in addition to the LiDAR dataset to detect the object.

3. The method according to claim 1, wherein the at least one autonomous driving operation comprises an object tracking operation, an object trajectory prediction operation, a vehicle trajectory determination operation, or a collision avoidance operation.

4. The method according to claim 1, wherein the matching is based on at least one of identifiers for each object detected in the at least one image, a mask identifier, cell identifiers for a mask, confidence values for each cell, LiDAR point identifiers, LiDAR point coordinates, extrinsic LiDAR sensor and camera calibration parameters, and intrinsic camera calibration parameters.

5. The method according to claim 1, wherein the probability distribution function is converted to image detection mask coordinates in accordance with the following mathematical equation $$x^m = R \frac{x^i - x_{bbox}^-}{x_{bbox}^+ - x_{bbox}^-}$$

where $x_{bbox}^+$ and $x_{bbox}^-$ represent image space boundaries of a bounding box, and R represents a mask resolution.

6. The method according to claim 1, wherein the matching comprises determining a probability distribution over a set of object detections in which a point of the LiDAR dataset is likely to be, based on at least one confidence value indicating a level of confidence that at least one respective pixel of the at least one image belongs to a given detected object.

7. The method according to claim 6, wherein the probability distribution is determined by computing a probability that a point of the LiDAR dataset projects into an image detection independent of all other image detections.

8. The method according to claim 7, wherein the probability is computed in accordance with the following mathematical equation $$p(lp \in mp) = \int_{mp} f(x^m, y^m) dmp = \int_{x_{mp}^-}^{x_{mp}^+} \int_{y_{mp}^-}^{y_{mp}^+} f(x^m, y^m) \, dy \, dx$$

where lp is a LiDAR point, mp is a mask pixel, $[x_{mp}^-, x_{mp}^+]$ represent the x limits of a pixel in mask coordinates, $[y_{mp}^-, y_{mp}^+]$ represents the y limits of the pixel in mask coordinates, dmp represents a mask pixel associated with a given object detection d, dy represents y-axis coordinate for a mask pixel associated with the given object detection d, and dx represents an x-axis coordinate for the mask pixel associated with the given object detection d.

9. The method according to claim 8, wherein the probability is computed in accordance with the following mathematical equation $$[\backslash hbox?] ip(lp \in d) =$$
$$p(d) \sum_{mask} p(lp \in p) p(mp \in d) = p(d) \sum_{x=0}^{R} \sum_{y=0}^{R} p(lp \in mp_{x,y}) p(mp_{x,y} \in d).$$

10. The method according to claim 7, wherein the matching comprises determining a probability that the LiDAR point does not project into any image detection.

11. The method according to claim 10, wherein the matching comprises normalizing a plurality of probabilities determined for a given point of the LiDAR dataset in accordance with the following mathematical equation $$dp(lp \in d_i) = p(\exists \, dlp \in d) dp(lp \in d_i \mid \exists \, dlp \in d) =$$

-continued $$[1 - p(\forall\, dlp \notin d)]\frac{ip(lp \in d_i)}{\sum_{detections} ip(lp \in d)},$$

where ip(lp∈ d) represents a probability that that a point of the LiDAR dataset projects into an image detection independent of all other image detections and p(∀d lp∉ d) represents a probability that the LiDAR point does not project into any image detection.

12. A system, comprising:
a processor;
a non-transitory computer-readable storage medium comprising programming instructions that are configured to cause the processor to implement a method for operating an autonomous vehicle, wherein the programming instructions comprise instructions to:
obtaining, by a computing device, a LiDAR dataset generated by a LiDAR system of the autonomous vehicle;
using, by a computing device, the LiDAR dataset and at least one image to detect an object that is in proximity to the autonomous vehicle, the object being detected by matching points of the LiDAR dataset to pixels in the at least one image, and
detecting the object in a point cloud defined by the LiDAR dataset based on the matching;
using, by the computing device, the object detection to facilitate at least one autonomous driving operation,
wherein the matching comprises determining a probability distribution of pixels of the at least one image to which a point of the LiDAR dataset may project taking into account a projection uncertainty in view of camera calibration uncertainties, and the probability distribution is determined by computing a probability distribution function over image space coordinates for a pixel to which a point of the LiDAR dataset would probably project.

13. The system according to claim 12, wherein the programming instructions further comprise instructions to obtain at least one image that was captured at a time when a sensor of the LiDAR system swept over a center of a camera Field Of View ("FOV"), wherein the at least one image is used in addition to the LiDAR dataset to detect the object.

14. The system according to claim 12, wherein the at least one autonomous driving operation comprises an object tracking operation, an object trajectory prediction operation, a vehicle trajectory determination operation, or a collision avoidance operation.

15. The system according to claim 12, wherein the matching is based on at least one of identifiers for each object detected in the at least one image, a mask identifier, cell identifiers for a mask, confidence values for each cell, LiDAR point identifiers, LiDAR point coordinates, extrinsic LiDAR sensor and camera calibration parameters, and intrinsic camera calibration parameters.

16. The system according to claim 12, wherein the probability distribution function is computed in accordance with following mathematical equation $$\begin{bmatrix} x^i \\ y^i \\ 1 \end{bmatrix} = M_{int} T^{Camera}_{Vehicle} T^{Vechile}_{LiDAR} \begin{bmatrix} X \\ Y \\ Z \\ 1 \end{bmatrix}$$

where $x^i$ and $y^i$ represent image space coordinates for a pixel, and X, Y and Z represent LiDAR space coordinates for a point of the LiDAR dataset.

17. The system according to claim 12, wherein the probability distribution function is converted to image detection mask coordinates in accordance with the following mathematical equation $$x^m = R\frac{x^i - x^-_{bbox}}{x^+_{bbox} - x^-_{bbox}}$$

where $x_{bbox}^+$ and $x_{bbox}^-$ represent image space boundaries of a bounding box, and R represents a mask resolution.

18. The system according to claim 12, wherein the matching comprises determining a probability distribution over a set of object detections in which a point of the LiDAR dataset is likely to be, based on at least one confidence value indicating a level of confidence that at least one respective pixel of the at least one image belongs to a given detected object.

19. The system according to claim 18, wherein the probability distribution is determined by computing a probability that a point of the LiDAR dataset projects into an image detection independent of all other image detections.

20. The system according to claim 19, wherein the probability is computed in accordance with the following mathematical equation $$p(lp \in mp) = \int_{mp} f(x^m, y^m) dmp = \int_{x_{mp}^-}^{x_{mp}^+} \int_{y_{mp}^-}^{y_{mp}^+} f(x^m, y^m) dy\, dx$$

where lp is a LiDAR point, mp is a mask pixel, $[x_{mp}^-, x_{mp}^+]$ represent the x limits of a pixel in mask coordinates, $[y_{mp}^-, y_{mp}^+]$ represents they limits of the pixel in mask coordinates, dmp represents a mask pixel associated with a given object detection d, dy represents y-axis coordinate for a mask pixel associated with the given object detection d, and dx represents an x-axis coordinate for the mask pixel associated with the given object detection d.

21. The system according to claim 20, wherein the probability is computed in accordance with the following mathematical equation $$[\backslash hbox?] ip(lp \in d) =$$

$$p(d) \sum_{mask} p(lp \in mp) p(mp \in d) = p(d) \sum_{x=0}^{R} \sum_{y=0}^{R} p(lp \in mp_{x,y}) p(mp_{x,y} \in d).$$

22. The system according to claim 19, wherein the matching comprises determining a probability that the LiDAR point does not project into any image detection.

23. The method according to claim 22, wherein the matching comprises normalizing a plurality of probabilities determined for a given point of the LiDAR dataset in accordance with the following mathematical equation $$dp(lp \in d_i) = p(\exists\, dlp \in d) dp(lp \in d_i \mid \exists\, dlp \in d) =$$

$$[1 - p(\forall\, dlp \notin d)]\frac{ip(lp \in d_i)}{\sum_{detections} ip(lp \in d)},$$

where ip(lp∈ d) represents a probability that that a point of the LiDAR dataset projects into an image detection independent of all other image detections and $p(\forall d\ lp \not\in d)$ represents a probability that the LiDAR point does not project into any image detection.

\* \* \* \* \*